United States Patent
Terada et al.

(10) Patent No.: US 6,942,823 B2
(45) Date of Patent: Sep. 13, 2005

(54) CONDUCTIVE MASTERBATCH AND CONDUCTIVE RESIN COMPOSITION

(75) Inventors: Kazunori Terada, Sodegaura (JP); Kazuya Noda, Sodegaura (JP)

(73) Assignee: Asahi Kasei Chemicals Corporation, Tokyo (JP)

( * ) Notice: Subject to any disclaimer, the term of this patent is extended or adjusted under 35 U.S.C. 154(b) by 24 days.

(21) Appl. No.: 10/620,557

(22) Filed: Jul. 17, 2003

(65) Prior Publication Data

US 2004/0082729 A1 Apr. 29, 2004

(30) Foreign Application Priority Data

Dec. 26, 2002 (JP) .......................................... 2002-377006
May 29, 2003 (JP) .......................................... 2003-153159

(51) Int. Cl.$^7$ .............................. H01B 1/24; C08J 3/22; C08L 71/02; C08G 69/26; C08K 3/04
(52) U.S. Cl. ......................... 252/511; 264/105; 524/496
(58) Field of Search .......................... 252/511; 264/104, 264/105; 524/495, 496

(56) References Cited

U.S. PATENT DOCUMENTS

| | | |
|---|---|---|
| 3,379,792 A | 4/1968 | Finholt |
| 5,075,036 A | 12/1991 | Parish et al. |
| 5,078,936 A | 1/1992 | Parish et al. |
| 5,741,846 A | 4/1998 | Lohmeijer et al. |
| 5,843,340 A | 12/1998 | Silvi et al. |
| 5,977,240 A | 11/1999 | Lohmeijer et al. |
| 6,019,829 A * | 2/2000 | Omae et al. ............. 106/31.65 |
| 2003/0116757 A1 | 6/2003 | Miyoshi et al. |
| 2003/0130405 A1 | 7/2003 | Takagi et al. |
| 2004/0238793 A1 | 12/2004 | Hossan et al. |

FOREIGN PATENT DOCUMENTS

| | | |
|---|---|---|
| EP | 0506386 A2 | 3/1992 |
| JP | 63-130644 A | 6/1988 |
| JP | 2-201811 A | 8/1990 |
| JP | 6-341016 A | 12/1994 |
| JP | 7-11047 A | 1/1995 |
| JP | 7-179750 A | 7/1995 |
| JP | 2000-172085 A | 6/2000 |
| JP | 2001-265130 A | 9/2001 |
| JP | 2002-287528 A | 10/2002 |
| JP | 2002-308995 A | 10/2002 |
| JP | 2003-064255 A | 3/2003 |
| JP | 2003-131463 A | 5/2003 |

OTHER PUBLICATIONS

"Kagakugijutsushi (Journal of Chemical technology) MOL", vol. 25, pp. 41–46, published by Ohmsha Ltd. Japan, (Nov. 1987) with a partial English Translation.

* cited by examiner

*Primary Examiner*—Mark Kopec
(74) *Attorney, Agent, or Firm*—Birch, Stewart, Kolsach & Birch, LLP

(57) ABSTRACT

Disclosed is a conductive masterbatch comprising a polyamide and conductive carbon black, the conductive carbon black being present in the form of at least one agglomerated particle having a major axis of 20 to 100 μm, wherein the number of the agglomerated particle(s) is 1 to 100 as observed under an optical microscope with respect to a contiguous area of 3 mm$^2$.

17 Claims, 9 Drawing Sheets

CONDUCTIVE MASTERBATCH AND CONDUCTIVE RESIN COMPOSITION

This application claims priority under 35 U.S.C. § 119(a) on patent application Ser. Nos. 2002-377006 and 2003-153159 filed in JAPAN on Dec. 26, 2002 and May 29, 2003, respectively, which are herein incorporated by reference.

BACKGROUND OF THE INVENTION

1. Field of the Invention

The present invention relates to a conductive masterbatch. More particularly, the present invention is concerned with a conductive masterbatch comprising a polyamide and conductive carbon black, the conductive carbon black being present in the form of at least one agglomerated particle having a major axis of 20 to 100 $\mu$m, wherein the number of the agglomerated particle(s) is 1 to 100 as observed under an optical microscope with respect to a contiguous area of 3 $mm^2$. By the use of the conductive masterbatch of the present invention, it becomes possible to obtain a conductive resin composition which not only has excellent heat resistance, but also simultaneously exhibits excellent conductivity and impact resistance (wherein the "excellent conductivity" means a conductivity which is comparable or superior to that of a conventional material for use in a processing involving an electrostatic coating, i.e., conductivity sufficient for a material to be electrostatically coated). Such a conductive resin composition can be used in a wide variety of fields, such as electric and electronic parts, parts of office automation machines, automobile parts and other mechanical parts. Especially, the conductive resin composition is very advantageous as a material for producing an automobile outer panel (e.g., an automobile fender) because when the above-mentioned resin composition is molded into a large article (such as an automobile outer panel, a door panel or the like) and the resultant molded article is then subjected to an electrostatic coating, an excellent molded article can be obtained, wherein the molded article is unlikely to suffer not only heat distortion but also a lowering of the impact resistance and wherein an excellent coating can be formed on such a molded article due to the excellent conductivity of the resin composition. The present invention is also concerned with a method for efficiently producing the above-mentioned resin composition.

2. Prior Art

Polyphenylene ethers not only have excellent mechanical and electrical properties and excellent heat resistance, but also have excellent dimensional stability. Therefore, polypheneylene ethers have been used in a wide variety of fields. However, the moldability of a polyphenylene ether is poor. For improving the moldability of a polyphenylene ether, Examined Japanese Patent Publication No. Sho 45-997 discloses a technique in which a polyamide is added to a polyphenylene ether, to thereby obtain a polyamide-polyphenylene ether alloy. Nowadays, polyamide-polyether alloys are used in a very wide variety of fields.

Recently, as an electrostatically coatable material, use of a conductivity-imparted polyamide-polyphenylene ether alloy is rapidly expanding in the fields of automobile outer panels (such as a fender and a door panel). For example, it has been attempted to use an automobile fender made of a polyamide-polyphenylene ether alloy for the purpose of improving not only the safety of automobiles (e.g., protection of pedestrians) but also the ability of an automobile fender to recover from distortion.

The materials used for an automobile outer panel are required to have various good properties, such as a conductivity sufficient for electrostatic coating, impact resistance, heat resistance and melt-fluidity.

With respect to the method for imparting a conductivity to a polyamide-polyphenylene ether alloy, for example, Unexamined Japanese Patent Application Laid-Open Specification No. Hei 2-201811 discloses a technique to lower the surface resistance of a polyamide-polyphenylene ether alloy by a method in which carbon black is caused to be contained mainly in the polyamide phase of the polyamide-polyphenylene ether alloy, or by a method in which carbon black is uniformly dispersed in a polyamide, followed by mixing thereof with a polyphenylene ether. There have generally been known a method for uniformly dispersing fine particles (such as particles of carbon black) in a high viscosity substance, and products obtained by such a method (see, for example, "Kagakugijutsushi (Journal of Chemical technology) MOL", pp. 41–46, published by Ohmsha Ltd. Japan, November 1987.

Unexamined Japanese Patent Application Laid-Open Specification No. Hei 8-48869 (corresponding to U.S. Pat. No. 5,977,240) discloses a technique in which a polyamide and a polyphenylene ether are compatibilized with each other in advance, followed by addition of carbon black, to thereby obtain a resin composition having good impact strength, good melt-fluidity, and low volume resistivity.

Further, Unexamined Japanese Patent Application Laid-open Specification No. Hei 4-300956 (corresponding to EP 506386) describes that, in the production of a composition containing a polyamide, a polyphenylene ether, carbon black and a compatibility agent, by adjusting the amounts of these components and using a polyphenylene ether and a polyamide which have specific relative viscosities, it becomes possible to improve the conductivity and processability of the composition.

International Patent Application Publication No. WO 01/81473 discloses a technique in which a conductive carbonaceous filler (Ketjen Black (KB)) is caused to be present in a particulate form in the polyphenylene ether phase of a polyamide/polyphenylene ether resin composition. In this patent document, the structure of the resin composition is observed under a transmission electron microscope with a magnification as high as 20,000, but the observation was made only to confirm the presence of KB particles (size: around 50 nm) which are much smaller than 20 $\mu$m. Further, the impact resistance of the resin composition was unsatisfactory. In this patent document, the resin composition was produced using a masterbatch; however, there is no description about the specific features of the masterbatch.

The resin compositions and molded articles obtained by the above-mentioned conventional techniques are likely to suffer heat distortion. Further, conventionally, it has been impossible to produce a resin composition which is improved with respect to all of the conductivity, impact resistance and heat distortion resistance. Particularly, the conventional resin compositions were not satisfactory as a material for producing an article (such as an automobile outer panel) which is large in size and which needs to be used in a processing involving an electrostatic coating and needs to have high heat distortion resistance, high impact resistance and conductivity sufficient for electrostatic coating. Therefore, the development of a new technique to produce a material suitable for use in the production of the above-mentioned article has been desired in the art.

SUMMARY OF THE INVENTION

The present inventors have made extensive and intensive studies with a view toward solving the above-mentioned problems. As a result, it has surprisingly been found that a specific conductive masterbatch enables the production of a conductive resin composition which not only has excellent heat resistance, but also simultaneously exhibits excellent conductivity and impact resistance (wherein the "excellent conductivity" means a conductivity which is comparable or superior to that of a conventional material for use in a processing involving an electrostatic coating, i.e., conductivity sufficient to enable a material to be electrostatically coated). The above-mentioned specific conductive masterbatch comprises a polyamide and conductive carbon black, the conductive carbon black being present in the form of at least one agglomerated particle having a major axis of 20 to 100 $\mu$m, wherein the number of the agglomerated particle(s) is 1 to 100 as observed under an optical microscope with respect to a contiguous area of 3 mm$^2$. When a molded article produced from the above-mentioned conductive resin composition is subjected to an electrostatic coating, not only is the molded article unlikely to suffer heat distortion and a lowering of the impact resistance, but also an excellent coating can be formed on the molded article due to the excellent conductivity of the resin composition. The present invention has been completed, based on these novel findings.

Accordingly, it is an object of the present invention to provide a conductive masterbatch which can be advantageously used for producing a conductive resin composition which not only has excellent heat resistance, but also simultaneously exhibits excellent conductivity and impact resistance, so that, when a molded article obtained from the resin composition is subjected to an electrostatic coating, not only is the molded article unlikely to suffer heat distortion and a lowering of the impact resistance, but also an excellent coating can be formed on the molded article due to the excellent conductivity of the resin composition.

It is another object of the present invention to provide the above-mentioned conductive resin composition.

It is still another object of the present invention to provide a method for efficiently producing the above-mentioned conductive resin composition.

The foregoing and other objects, features and advantages of the present invention will be apparent from the following detailed description taken in connection with the accompanying drawings and the appended claims.

DESCRIPTION OF REFERENCE NUMERALS

Figure 1:
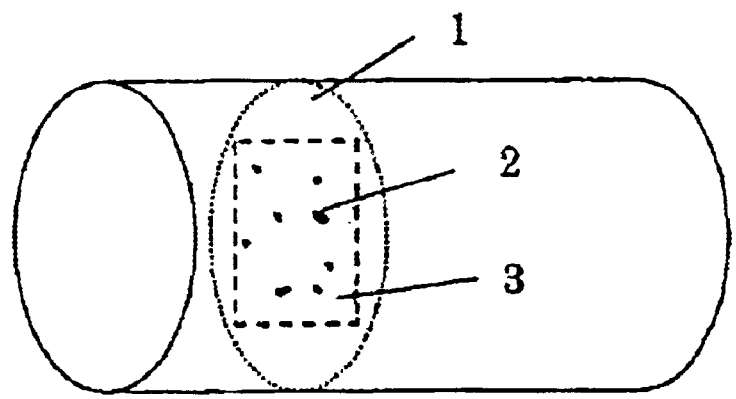
FIG. 1 is a schematic explanatory view of a cylindrical pellet of a conductive mast rbatch, showing a perspective view of a cross-section of the pellet, which cross-section is observed to determine the number of agglomerated particles of conductive carbon black.

1: cross-section of a pellet
1a: portion of a pellet at which the surface roughness (Ra) (central line average roughness determined in accordance with JIS 30601 (1982) or arithmetical average roughness determined in accordance with JIS B0601 (1994)) is determined
2: conductive carbon black
3: polyamide
4: central line defined in JIS B0601 (1982) (which corresponds to the "mean line" described in JIS B0601 (1994))
5: surface roughness (Ra) of a pellet
6: fender of an automobile
7: portion of the automobile fender including the portion at which the surface roughness is determined
8: section of a scanning probe microscopic image showing portion 7 of the automobile fender, at which section the surface roughness is determined
9: surface roughness of the automobile fender (the difference between the maximum height and minimum height of the surface portion of the automobile fender)

DETAILED DESCRIPTION OF THE INVENTION

In one aspect of the present invention, there is provided a conductive masterbatch comprising a polyamide and conductive carbon black, the conductive carbon black being present in the form of at least one agglomerated particle having a major axis of 20 to 100 $\mu$m, wherein the number of the agglomerated particle(s) is 1 to 100 as observed under an optical microscope with respect to a contiguous area of 3 mm$^2$.

For easy understanding of the present invention, the essential features and various embodiments of the present invention are enumerated below.

1. A conductive masterbatch comprising a polyamide and conductive carbon black, the conductive carbon black being present in the form of at least one agglomerated particle having a major axis of 20 to 100 $\mu$m, wherein the number of the at least one agglomerated particle is 1 to 100 as observed under an optical microscope with respect to a contiguous area of 3 mm$^2$.

2. The conductive masterbatch according to item 1 above, wherein the number of the at least one agglomerated particle is 1 to 50.

3. The conductive masterbatch according to item 1 above, wherein the number of the at least one agglomerated particle is 2 to 40.
4. The conductive masterbatch according to item 1 above, wherein the number of the at least one agglomerated particle is 2 to 30.
5. The conductive masterbatch according to item 1 above, wherein the conductive carbon black has a dibutyl phthalate (DBP) oil absorption of at least 250 ml per 100 g of the carbon black.
6. The conductive masterbatch according to item 1 above, which is in the form of pellets.
7. The conductive masterbatch according to item 6 above, wherein the surface roughness of each of the pellets is in the range of from 0.3 to 2.0 μm in terms of an average value of the surface roughness (Ra) values as measured by a surface roughness gauge with respect to a plurality of surface portions of each of the pellets.
8. The conductive masterbatch according to item 6 above, wherein the surface roughness of each of the pellets is in the range of from 0.4 to 1.5 μm.
9. The conductive masterbatch according to item 6 above, wherein each of the pellets has a cylindrical shape, and has a diameter of from 1.5 to 3.5 mm and a length of from 2.0 to 3.5 mm.
10. The conductive masterbatch according to item 1 above, wherein the amount of the conductive carbon black is in the range of from 5 to 40% by weight, based on the weight of the masterbatch.
11. The conductive masterbatch according to item 1 above, wherein the amount of the conductive carbon black is in the range of from 6 to 10% by weight, based on the weight of the masterbatch.
12. A conductive resin composition comprising a polyamide, a polyphenylene ether and conductive carbon black, which is produced by melt-kneading the conductive masterbatch of item 1 above with the polyphenylene ether and optionally an additional amount of a polyamide.
13. The conductive resin composition according to item 12 above, wherein the amount of the conductive carbon black is in the range of from 0.2 to 5 parts by weight, relative to 100 parts by weight of the total of the components of the conductive resin composition excluding the conductive carbon black.
14. The conductive resin composition according to item 12 above, which is for use in the production of an automobile outer panel.
15. A method for producing a conductive resin composition comprising a polyamide, a polyphenylene ether and conductive carbon black, which comprises the following steps:
(1) providing a conductive masterbatch comprising a polyamide and conductive carbon black, the conductive carbon black being present in the form of at least one agglomerated particle having a major axis of 20 to 100 μm, and
(2) adding the conductive masterbatch to a molten polyphenylene ether.
16. The method according to item 15 above, wherein, in the step (2), an additional amount of polyamide is added to the molten polyphenylene ether, simultaneously with the addition of the conductive masterbatch.
17. The method according to item 15 or 16 above, wherein the conductive masterbatch provided in step (1) is the masterbatch of item 1.

Hereinbelow, the components of the conductive masterbatch and conductive resin composition of the present invention will be described in detail.

With respect to the type of the polyamide which can be used in the present invention, there is no particular limitation so long as it is a polymer having amide {—NH—C(=O)—} linkages in a main chain thereof.

In general, a polyamide is obtained by a ring opening polymerization of a lactam, a condensation polymerization of a diamine and a dicarboxylic acid, and a condensation polymerization of an ω-aminocarboxylic acid. However, in the present invention, the method for obtaining a polyamide is not limited to these examples.

Examples of diamines mentioned above include aliphatic diamines, alicyclic diamines and aromatic diamines. Specifically, there can be mentioned tetramethylene diamine, hexamethylene diamine, undecamethylene diamine, dodecamethylene diamine, tridecamethylene diamine, 2,2,4-trimethylhexamethylene diamine, 2,4,4-trimethylhexamethylene diamine, 5-methylnonamethylene diamine, 1,3-bisaminomethyl cyclohexane, 1,4-bisaminomethyl cyclohexane, m-phenylene diamine, p-phenylene diamine, m-xylylene diamine and p-xylylene diamine.

Examples of dicarboxylic acids include aliphatic dicarboxylic acids, alicyclic dicarboxylic acids and aromatic dicarboxylic acids. Specifically, there can be mentioned adipic acid, suberic acid, azelaic acid. sebacic acid, dodecanoic diacid, 1,1,3-tridecanoic diacid, 1,3-cyclohexane dicarboxylic acid, terephthalic acid, isophthalic acid, naphthalene dicarboxylic acid and a dimmer acid.

Specific examples of lactams include ε-caprolactam, enanthlactam and ω-laurocaprolactam.

Further, specific examples of ω-aminocarboxylic acids include ε-aminocaproic acid, 7-aminoheptanoic acid, 8-aminooctanoic acid, 9-aminononanoic acid, 11-aminoundecanoic acid, 12-aminododecanoic acid and 13-aminotridecanoic acid.

In the present invention, the polyamide may either be a homopolymer obtained by homopolymerizing any one of the above-mentioned compounds (i.e., lactams, diamines, dicarboxylic acids and ω-aminocarboxylic acids), or a copolymer obtained by subjecting a mixture of at least two types of the above-mentioned compounds to a condensation polymerization.

In the present invention, it is also preferred to use a polyamide obtained by a method in which at least one of the above-mentioned compounds (i.e., lactams, diamines, dicarboxylic acids and ω-aminocarboxylic acids) is polymerized in a polymerization reactor to thereby obtain a low molecular weight oligomer, and the obtained oligomer is subjected to farther polymerization in an extruder or the lik , to thereby obtain a high molecular weight polymer.

Examples of polyamides which can be advantageously used in the present invention include polyamide 6, polyamide 6,6, polyamide 4,6, polyamide 11, polyamide 12, polyamide 6,10, polyamide 6,12, polyamide 6/6,6, polyamide 6/6,12, polyamide MXD (m-xylylene diamine), 6, polyamide 6,T, polyamide 6,I, polyamide 6/6,T, polyamide 6/6,I, polyamide 6,6/6,T, polyamide 6,6/6,1, polyamide 6/6,T/6,I, polyamide 6,6/6,T/6,I, polyamide 6/12/6,T, polyamide 6,6/12/6,T, polyamide 6/12/6,I and polyamide 6,6/12/6,I. Further, it is also possible to use a polyamide which is obtained by copolymerizing a plurality of different polyamides using an extruder or the like.

Preferred examples of polyamides include polyamide 6, polyamide 6,6, a polyamide 6/6,6, and a mixture thereof.

The number average molecular weight of the polyamide used in the present invention is preferably 5,000 to 100,000, more preferably 10,000 to 30,000.

The polyamide used in the present invention is not limited to those which are exemplified above, and may be a mixture of a plurality of polyamides having different molecular weights. For example, the polyamide may be a mixture of a low molecular weight polyamide having a number average molecular weight of less than 15,000 and a high molecular weight polyamide having a number average molecular weight of 15,000 or more.

The terminal groups of the polyamide participate in a reaction with a polyphenylene ether. A polyamide generally has an amino group and a carboxyl group as terminal groups thereof. In general, when the carboxyl group concentration of a polyamide resin is increased, the impact resistance of such a polyamide becomes lowered whereas the melt-fluidity of the polyamide becomes improved. On the other hand, when the amino group concentration of a polyamide resin is increased, the impact resistance of such a polyamide becomes improved whereas the melt-fluidity of the polyamide becomes lowered.

In the present invention, the concentration ratio of the amino group to the carboxyl group (amino group/carboxyl group ratio) is preferably 9/1 to 1/9, more preferably 8/2 to 1/9, most preferably 6/4 to 1/9.

The concentration of the terminal amino group of the polyamide is preferably at least 10 milliequivalents, more preferably at least 30 milliequivalents, per kg of the polyamide.

Any conventional methods can be used to control the amounts of the terminal groups of the polyamides. For example, there can be mentioned a method in which a diamine, dicarboxylic acid or monocarboxylic acid is added to the reaction system of a polymerization for producing a polyamide so as to obtain a polyamide having a desired terminal amino group concentration, and a method in which two or more different polyamides having different terminal group ratios are mixed together.

Further, for improving the heat stability of a polyamide, a metal compound stabilizer as described in Unexamined Japanese Patent Application Laid-Open Specification No. Hei 1-163262 may be used.

Among the conventional metal compound stabilizers, especially preferred are CuI, $CuCl_2$, copper acetate and cerium stearate. Also preferred are halogen salts of alkali metals, such as potassium iodide and potassium bromide. These metal compound stabilizers can be used individually or in combination.

It is preferred that the metal compound stabilizer is added to the polyamide in an amount of 0.001 to 1 part by weight, relative to 100 parts by weight of the polyamide.

Further, any of other conventional additives for a polyamide can be also added to the polyamide. Such additive(s) can be used in an amount of less than 10 parts by weight, relative to 100 parts by weight of the polyamide.

Examples of polyphenylene ethers which can be used in the present invention include a homopolymer and a copolymer, each independently comprising a structural unit represented by the following formula (1):

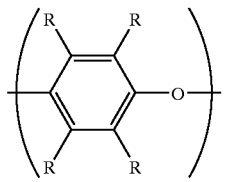

(1)

wherein O represents an oxygen atom, and each R independently represents a hydrogen atom, a halogen atom, a primary or secondary $C_1$–$C_7$ alkyl group, a phenyl group, a $C_1$–$C_7$ haloalkyl group, a $C_1$–$C_7$ aminoalkyl group, a $C_1$–$C_7$ hydrocarbyloxy group or a halohydrocarbyloxy group (in which at least two carbon atoms are present between the halogen atom and the oxygen atom).

Specific examples of polyphenylene ethers used in the present invention include poly(2,6-dimethyl-1,4-phenylene ether), poly(2-methyl-6-ethyl-1,4-phenylene ether), poly(2-methyl-6-phenyl-1,4-phenylene ether) and poly(2,6-dichloro-1,4-phenylene ether). Further examples of polyphenylene ethers include a copolymer of 2,6-dimethylphenol and another phenol (for example, a copolymer of 2,6-dimethylphenol and 2,3,6-trimethylphenol and a copolymer of 2,6-dimethylphenol and 2-methyl-6-butylphenol, which are described in Examined Japanese Patent Application Publication No, Sho 52-17880).

Among the above-mentioned polyphenylene ethers, preferred are poly(2,6-dimethyl-1,4-phenylene ether), a copolymer of 2,6-dimethylphenol and 2,3,6-trimethylphenol, and a mixture thereof.

With respect to the methods for producing the polyphenylene ether used in the present invention, there is no particular limitation, and any conventional methods can be used. For example, there can be mentioned methods as described in U.S. Pat. Nos. 3,306,874, 3,306.875, 3,257,357 and 3,257,358 and Unexamined Japanese Patent Application Laid-Open Specification Nos. Sho 50-51197 and Sho 63-152628.

With respect to the polyphenylene ether which can be used in the present invention, the reduced viscosity ($\eta_{sp}/c$) thereof is preferably in the range of from 0.15 to 0.70 dl/g, more preferably from 0.20 to 0.60 dl/g, most preferably from 0.40 to 0.55 dl/g, as measured at 30° C. with respect to a 0.5 g/dl chloroform solution of the polyphenylene ether).

In the present invention, a mixture of two or more different types of polyphenylene ethers having different reduced viscosities can be used without causing any problems. As examples of such a mixture, there can be mentioned a mixture of a polyphenylene ether having a reduced viscosity of from more than 0.40 dl/g to 0.45 dl/g or less and a polyphenylene ether having a reduced viscosity of 0.50 dl/g or more, and a mixture of a low molecular weight polyphenylene other having a reduced viscosity of 0.40 dl/g or less and a polyphenylene ether having a reduced viscosity of 0.50 dl/g or more, but the polyphenylene ether mixtures are not limited to those which are exemplified above.

The polyphenylene ether used in the present invention may contain less than 5% by weight of an organic solvent, relative to 100 parts by weight of the polyphenylene ether, wherein the organic solvent is the residual polymerization solvent used for producing the polyphenylene ether. It is difficult to remove the residual polymerization solvent completely by the drying operation performed after the polymerization reaction, the solvent usually remains in the polyphenylene ether in a concentration of several hundred ppm to several % by weight. The organic solvent mentioned herein, which is the residual polymerization solvent, may be at least one solvent selected from the group consisting of toluene, isomers of xylene, ethylbenzene, alcohols having 1 to 5 carbon atoms, chloroform, dichloromethane, chlorobenzene and dichlorobenzene.

Further, the polyphenylene ether used in the present invention may be in a modified form or may be in the form of a mixture of an unmodified polyphenylene ether and a modified polyphenylene ether (hereinafter, the modified polyphenylene ether and a mixture of an unmodified polyphenylene ether and a modified polyphenylene ether are collectively referred to as "modified polyphenylene ether").

In the present invention, the "modified polyphenylene ether" means a polyphenylene ether which is modified with at least one modifier compound having at least one unsaturated bond selected from the group consisting of a carbon—carbon double bond and a carbon—carbon triple bond and having at least one group selected from the group consisting of a carboxylic acid group, an acid anhydride group, an amino group, a hydroxyl group and a glycidyl group.

As examples of methods for producing the modified polyphenylene ether, there can be mentioned the following methods (1) to (3):

(1) a method in which polyphenylene ether is reacted with a modifier compound in either the presence or absence of a radical initiator at a reaction temperature which is 100° C. or higher and lower than the glass transition temperature of the polyphenylene ether, so that the reaction proceeds without causing the melting of the polyphenylene ether;

(2) a method in which a polyphenylene ether and a modifier compound are melt-kneaded in either the presence or absence of a radical initiator at a temperature which is equal to or higher than the glass transition temperature of the polyphenylene ether and not higher than 360° C. to thereby perform a reaction; and (3) a method in which a polyphenylene ether and a modifier compound are reacted in a solvent therefor in either the presence or absence of a radical initiator at a temperature which is lower than the glass transition temperature of the polyphenylene ether.

In the present invention, any of the above-mentioned methods (1) to (3) can be employed, but methods (1) and (2) are preferred.

Next, a specific explanation is made on the above-mentioned modifier compound having at least one unsaturated bond selected from the group consisting of a carbon—carbon double bond and a carbon—carbon triple bond and having at least one group selected from the group consisting of a carboxylic acid group, an acid anhydride group, an amino group, a hydroxyl group and a glycidyl group.

As examples of modifier compounds having a carbon—carbon double bond and a carboxylic acid group and/or an acid anhydride group, there can be mentioned unsaturated dicarboxylic acids, such as maleic acid, fumaric acid, chloromaleic acid, cis-4-cyclohexene-1,2-dicarboxylic acid and acid anhydrides thereof. Among the above-mentioned compounds, fumaric acid, maleic acid and maleic anhydride are preferred, and fumaric acid and maleic anhydride are more preferred.

Further, it is also possible to use a compound which is obtained by esterifying one or two carboxyl groups of any of the above-mentioned unsaturated dicarboxylic acids.

As examples of modifier compounds having a carbon—carbon double bond and a glycidyl group, there can be mentioned allylglycidyl ether, glycidyl acrylate, glycidyl methacrylate and epoxidized natural oils and fats.

Among the above-mentioned compounds, glycidyl acrylate and glycidyl methacrylate are especially preferred.

As examples of modifier compounds having a carbon—carbon double bond and a hydroxyl group, there can be mentioned unsaturated alcohols represented by the following formula: $C_nH_{2n-3}OH$ (wherein n is a positive integer), such as an allyl alcohol, 4-pentene-1-ol and 1,4-pentadiene-3-ol; and unsaturated alcohols represented by the following formulae: $C_nH_{2n-5}OH$ and $C_nH_{2n-7}OH$ (wherein n is a positive integer).

The above-mentioned modifier compounds may be used individually or in combination.

The amount of the modifier compound used for producing the modified polyphenylene ether is preferably 0.1 to 10 parts by weight, more preferably 0.3 to 5 parts by weight, relative to 100 parts by weight of the polyphenylene ether.

As the above-mentioned radical initiator, any of conventional organic peroxides and diazo group-containing compounds can be used. Specific examples of radical initiators include benzoyl peroxide, dicumyl peroxide, di-tert-butyl peroxide, tert-butylcumyl peroxide., tert-butyl hydroperoxide, cumene hydroperoxide and azobisisobutyronitrile.

When a modified polyphenylene ether is produced by using a radical initiator, the radical initiator is preferably used in amount of 0.001 to 1 parts by weight, relative to 100 parts by weight of the polyphenylene ether.

It is preferred that the amount of modifier compound incorporated into the modified polyphenylene ether is 0.01 to 5% by weight, more preferably 0.1 to 3% by weight, based on the weight of the modified polyphenylene ether.

The modified polyphenylene ether may contain unreacted modifier compound and/or a polymer of the modifier compound.

For reducing the amount of the unreacted modifier compound and/or the polymer of the modifier compound contained in the modified polyphenylene ether, if desired, a compound having an amide linkage and/or an amino group may be added during the production of the modified polyphenylene ether.

In the present invention, the "compound having an amide linkage" means a compound having a structure represented by the formulas —NH—C(—O)—, and the "compound having an amino group" means a compound having at least one terminal —$NH_2$ group. Specific example of compounds having an amide linkage and/or an amino group include aliphatic amines, such as octyl amine, nonyl amine, tetramethylene diamine and hexamethylene diamine; aromatic amines, such as aniline, m-phenylenediamine, p-phenylenediamine, m-xylylenediamine and p-xylylenediamine; products obtain d by reacting any of the above-mentioned amines with a carboxylic acid or a dicarboxylic acid; lactams such as ε-caprolactam; and polyamide resins, but the compounds having an amide linkage and/or an amino group are not limited to the compounds exemplified above.

When the compound having an amide bond and/or an amino group is used, it is preferred that the amount of the compound is 0.001 part by weight or more and less than 5 parts by weight, more preferably 0.01 part by weight or more and less than 1 part by weight, still more preferably 0.01 part by weight or more and less than 0.1 part by weight, relative to 100 parts by weight of the polyphenylene ether.

Next, an explanation is made on the conductive carbon black used in the present invention. In the present invention, it is preferred that the conductive carbon black has a dibutyl phthalate (DBP) oil absorption of at least 250 ml, more advantageously at least 300 ml, most advantageously at least 350 ml, per 100 g of the carbon black. In the present invention, the DBP oil absorption is a value obtained in accordance with ASTM D2414.

Further, it is preferred that the conductive carbon black used in the present invention is a carbon black having a BET surface area of at least 200 $cm^2$, more advantageously at least 400 $cm^2$, per gram of the carbon black. Examples of such conductive carbon blacks which are commercially available include Ketjen black EC and a Ketjen black EC-600JD, both manufactured by Ketjen Black International Co., Japan.

The conductive masterbatch of the present invention can be obtained by melt-kneading a polyamide and conductive carbon black.

The conductive masterbatch of the present invention can be in the form of pellets, a powder or granules, and it is preferred that the masterbatch is in the form of pellets, more advantageously cylindrical pellets having a diameter of 1.5 mm to 3.5 mm and a length of 2.0 mm to 3.5 mm. Hereinbelow, the pellets of the conductive masterbatch are referred to as "master pellets".

The amount of the conductive carbon black contained in the conductive masterbatch is preferably 5 to 40% by weight, more preferably 5 to 25% by weight, more preferably 6 to 15% by weight, most preferably 6 to 10% by weight, based on the weight of the masterbatch (more precisely, based on the total weight of the polyamide and the conductive carbon black). Especially when the amount of the conductive carbon black in the conductive masterbatch is 6 to 10% by weight, not only can the lowering of the molecular weight of the polyamide contained in the masterbatch be prevented, but also the productivity of the masterbatch can be improved.

In the present invention, it is important that the conductive carbon black in the masterbatch is present in the form of at least one agglomerated particle having a major axis of 20 to 100 $\mu m$ (when the masterbatch is present in the form of a plurality of agglomerated particles, the major axes of the particles may be the same or different). When the conductive carbon black in the masterbatch is present in the form of agglomerated particle(s), the conductivity of the masterbatch is improved as compared to that of a masterbatch in which the conductive carbon black is not present in the form of agglomerated particle(s). Further, the number of the above-mentioned agglomerated particle(s) needs to be in the range of from 1 to 100, and is preferably 1 to 50, more preferably 2 to 40, most preferably 2 to 30, as observed under an optical microscope with respect to a contiguous area of 3 $mm^2$. When a resin composition is produced using a masterbatch which contains no agglomerated particle of the above-mentioned size, the conductivity of the resin composition becomes lowered. On the other hand, when a resin composition is produced using a masterbatch which contains more than 100 agglomerated particles of the above-mentioned size, the impact resistance of the resin composition becomes lowered. Further, the masterbatch of the present invention may contain at least one agglomerated particle having a major axis of less than 20 $\mu m$ and at least one agglomerated particle having a major axis of more than 100 $\mu m$.

In the present invention, with respect to the number of the agglomerated particle(s) having a major axis of less than 20 $\mu m$, there is no particular limitation. With respect to the number of the agglomerated particle(s) having a major axis of more than 100 $\mu m$, there is also no particular limitation, but it is preferred that the number of such a large agglomerated particle(s) is ⅕ or less, more preferably ¹⁄₁₀ or less of the number of the agglomerated particles) having a major axis of 20 to 100 $\mu m$.

In the present invention, the size and number of the agglomerated particles) of the conductive carbon black are determined by a method which is explained below, referring to FIGS. 1 and 2. A pellet of the masterbatch (i.e., master pellet) is cut by means of a microtome equipped with a glass knife to thereby obtain cross-section 1 which has a mirror surface. The light reflected from the cross-section 1 is observed with a magnification of ×50 under an optical microscope (for example, "PME3" manufactured and sold by Olympus Optical Co. Ltd., Japan), and a photomicrograph of cross-section 1 is taken. With respect to a contiguous area of 3 $mm^2$ in the photomicrograph, the number of agglomerated particles 2 (each independently having a major axis of 20 to 100 $\mu m$) present in the polyamide matrix 3 is counted by visual observation. When the master pellet has a cylindrical or rectangular parallelepiped shape, the pellet is cut in a direction substantially perpendicular to the longitudinal direction of the pellet, thereby obtaining a cross-section, and the resultant cross-section is observed (see FIG. 1).

Figure 2:
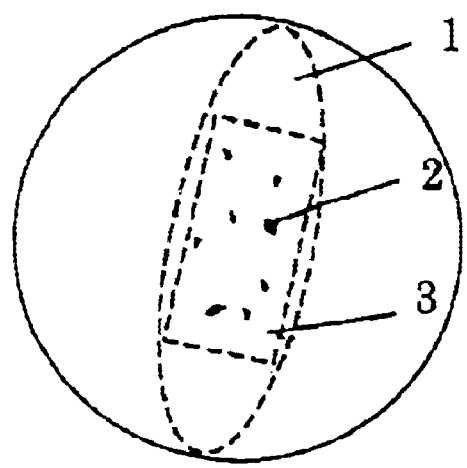
FIG. 2 is a schematic explanatory view of a spherical pellet of a conductive masterbatch, showing a perspective view of a cross-section of the pellet, which cross-section is observed to determine the number of agglomerated particles of conductive carbon black.

When the master pellet has a granular or spherical shape, the pellet is cut along a plane including the center of the pellet, and the resultant cross-section of the pellet is observed (see FIG. 2). The number of the agglomerated particles (each independently having a major axis of 20 to 100 $\mu m$) was counted with respect to at least three cross-sections which are, respectively, obtained from different pellets, and an average value of the measured values is calculated. The obtained average value is defined as the number of agglomerated particles (each independently having a major axis of 20 to 100 $\mu m$) present in the conductive masterbatch. When there is a large difference in the number of the agglomerated particles between the cross-sections, it is preferred to observe more than 3 cross-sections. Specifically, for example, 5 to 10 cross-sections are observed, and the average value of 5 to 10 measured values is obtained. When a cross-section having a contiguous area of 3 $mm^2$ or more cannot be obtained, a plurality of cross-sections are observed to count the number of the agglomerated particles present in the cross-sections having a total area of 3 $mm^2$.

In the present invention, it is preferred that the surface roughness of each of the pellets (master pallets) is in the range of from 0.3 to 2.0 $\mu m$, more preferably from 0.4 to 1.5 $\mu m$, in terms of an average value of the surface roughness (Ra) values as measured by a surface roughness gauge with respect to a plurality of surface portions of each of the pellets. By virtue of such specific surface roughness of the master pellets, when a molded article of the resin composition, which is produced using the master pellets, is subjected to an electrostatic coating, the molded article is unlikely to suffer heat distortion and simultaneously exhibits excellent conductivity and excellent impact resistance. When the surface roughness of the master pellets is less than 0.3 $\mu m$, the conductivity and heat resistance of the resultant resin composition is likely to be lowered, and when the surface roughness of the master pellets is more than 2.0 $\mu m$, the impact resistance of the resultant resin composition is likely to be lowered.

The above-mentioned surface roughness gauge is an apparatus for measuring the unevenness of a surface, and the surface roughness gauge also includes a scanning probe microscope.

Even when the pellets of the conductive masterbatch (i.e., master pallets) are produced using an extruder under the same kneading conditions (i.e., resin temperature, revolving rate of a screw, discharge rate and the like), the number of the agglomerated particles of carbon black in the master pellets varies depending on the type and size of the extruder and the like. The number of the agglomerated particles of carbon black has a close relationship with the above-mentioned surface roughness (the larger the number of the agglomerated particles, the larger the surface roughness), and the number of the agglomerated particles can be controlled within the range defined in the present invention by employing kneading conditions under which the average value of the surface roughness (Ra) values of the produced master pellet falls within the above-mentioned range.

Figure 4:
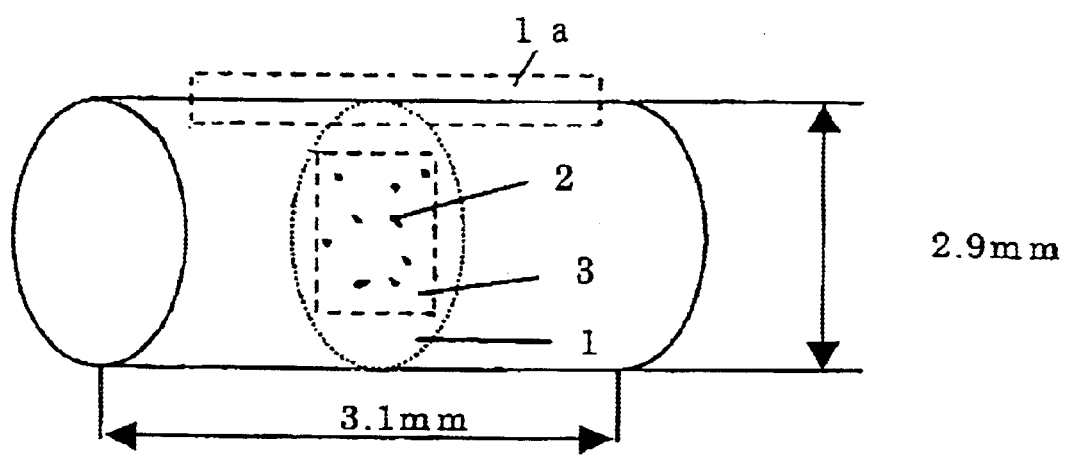
FIG. 4(a) is a schematic explanatory view of a conductive masterbatch (PA/KB-MB2) obtained in Example 1, showing a perspective view of a cross-section of the pellet, which cross-section is observed to determine the number of agglomerated particles of conductive carbon black.
FIG. 4(b) is an optical photomicrograph (×50) of the cross section of the pellet shown in FIG. 4(a)
FIG. 4(c) is an explanatory diagram showing a surface profile of the pellet shown in FIG. 4(a), which is referred to below for explaining the method for determining the surface roughness (Ra) of a pellet.
Figure 4:
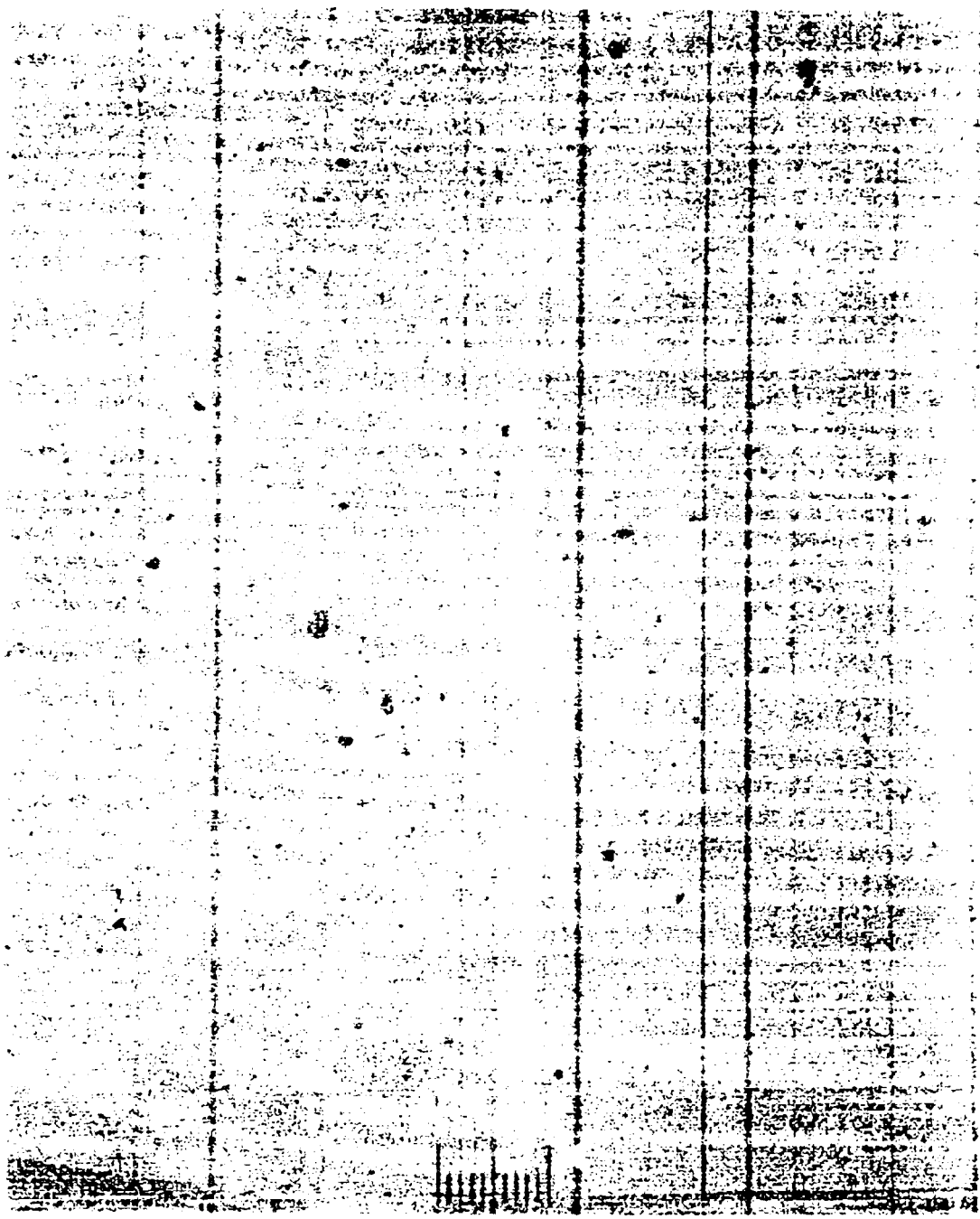
Figure 4:
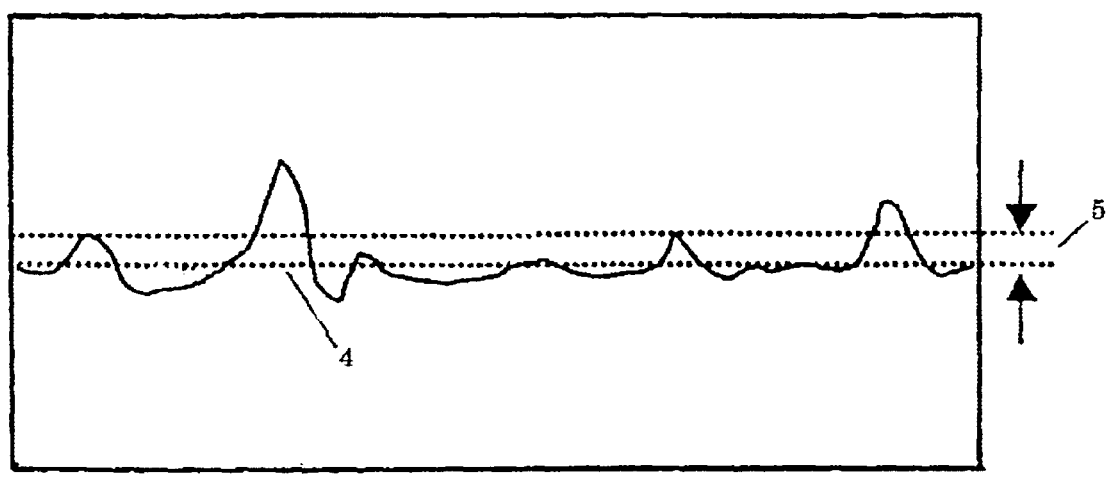

In the present invention, the surface roughness (Ra) of the master pellet is either a central line average roughness determined in accordance with JIS B0601 (1982) or an arithmetical average roughness determined in accordance with JIS B0601 (1994). The above-mentioned central line average roughness is substantially the same as the arithmetical average roughness. That is, both of the central line average roughness (Ra) and the arithmetical average roughness (Ra) are values determined from the roughness curve obtained using a surface roughness gauge. Specifically, with respect to a section of the roughness curve (e.g., a section shown in FIG. 4(c)), which section shows the surface profile of a target surface portion of a pellet, the arithmetical average of the absolute deviations of the roughness curve from the central line (e.g., central line 4 in FIG. 4(c)) (the "central line" is described in JIS B0601 (1982) and it corresponds to the "mean line" described in JIS B0601 (1994)) is calculated to obtain an average roughness (Ra). (The central line mentioned above is determined automatically by the below-mentioned apparatus, and the average roughness (Ra) is calculated, based on the thus determined central line.) However. JIS B0601 (1994) is th revised version of JIS B0601 (1982), and the conditions (e.g., cutoff value of the roughness curve) for obtaining the central line average roughness (Ra) are different from those for obtaining the arithmetical average roughness (Ra). Due to such difference in the conditions, the central line average roughness and arithmetical average roughness of a single sample may slightly differ from each other, but such slight difference is not at a level which causes any problem in the present invention. For this reason, in the present invention, the surface roughness (Ra) of the master pellet may be either the central line average roughness (Ra) or the arithmetical average roughness (Ra).

The surface roughness (Ra) can be determined, for example, by the following method. When the master pellet has a flat portion, the surface roughness (Ra) of the flat portion is measured using a surface roughness gauge Surfcom 579A (manufactured and sold by Tokyo Seimitsu Co., Ltd., Japan) wherein the measuring length is 2.5 mm. When the master pellet does not have a flat portion at which the measuring length of 2.5 mm can be obtained, the measurement is conducted with respect to a plurality of flat portions so as to obtain a total measuring length of 2.5 mm. In the case of a master pellet (such as a granular master pellet) having no flat portion, an image (60 μm×80 μm) of the surface of the pellet is observed by using a scanning probe microscope (SPA300HV, manufactured and sold by Seiko Instruments Inc., Japan), followed by three dimensional correction of the image to obtain an image showing the surface profile of the pellet. Using the obtained image showing the surface profile of the pellet, the central line average roughness (Ra) is obtained. In the present invention, the surface roughness of the pellet is an average value of 10 (Ra) values.

In the present invention, the average value of the surface roughness (Ra) values is inversely proportional to the luster of the pellet and the state of dispersion of the conductive carbon black in the pellet. That is, when substantially no agglomerated particle is present in the pellet, the luster of the pellet becomes high and the surf ace roughness becomes small. On the other hand, when the agglomerated particles are present in the pellet, the luster of the pellet becomes low and the surface roughness becomes large.

As a preferred method for producing the conductive masterbatch, there can be mentioned a method in which the raw materials for the conductive masterbatch are melt-kneaded by using a twin-screw extruder or a kneader. Especially preferred is a method in which a polyamide is melted, followed by addition of conductive carbon black. Specific examples of such methods include the following methods which use a twin-screw extruder or kneader having at least one first inlet and at least one second inlet which are, respectively, provided at an upstream portion(s) and a downstream portion(s) of the extruder or kneader;

a method in which a polyamide is fed from the first inlet of the extruder or kneader to thereby melt the polyamide, and conductive carbon black is added to the molten polyamide in the extruder or kneader from the second inlet thereof, followed by melt-kneading of the resultant mixture; and a method in which a polyamide is fed from the first inlet of the extruder or kneader to thereby melt the polyamide, and conductive carbon black and an additional amount of a polyamide are simultaneously added to the molten polyamide in the extruder or kneader from the second inlet thereof, followed by melt-kneading of the resultant mixture.

There is no particular limitation with respect to the melt-kneading temperature for producing the masterbatch, but the melt-kneading temperature can be appropriately selected from the temperatures which are not higher than 350° C.

The conductive masterbatch obtained by any of the above-mentioned methods can be melt-kneaded with a polyphenylene ether, and optionally with an additional amount of a polyamide, to thereby obtain the conductive resin composition of the present invention.

The amount of the conductive carbon black contained in the conductive resin composition is preferably in the range of from 0.2 to 5 parts by weight, relative to 100 parts by weight of the total of the components of the conductive resin composition excluding the conductive carbon black. Further, when the amount of the conductive carbon black is 0.2 to 3 parts by weight, the resin composition exhibits an excellent balance of impact resistance, melt-fluidity and conductivity.

With respect to the additional amount of a polyamide used for preparing the resin composition, any of the polyamides which are exemplified above can be used. The polyamide added to the masterbatch may be the same as or different from the polyamide contained in the masterbatch.

The conductive resin composition of the present invention may contain a styrene-containing thermoplastic resin in an amount of less than 50 parts by weight, relative to 100 parts by weight of the total of the polyamide and the polyphenylene ether. As examples of styrene-containing thermoplastic resins used in the present invention, there can be mentioned a polystyrene (homopolymer), a rubber-modified polystyrene (HIPS), a styrene-acrylonitrile copolymer (AS resin) and a styrene-rubber polymer-acrylonitrile copolymer (ABS resin).

Any of conventional additives which can be used for a polyphenylene ether can be added to the conductive resin composition in an amount of less than 10 parts by weight, relative to 100 parts by weight of the polyphenylene ether. Examples of conventional additives include metal compound stabilizers, such as zinc oxide and zinc sulfide; and organic stabilizers, such as a hindered phenol type stabilizer, a phosphorous type stabilizer and a hindered amine type stabilizer.

Further, the conductive resin composition of the present invention may contain an impact modifier.

As the impact modifier added to the conductive resin composition of the present invention, for example, it is possible to use at least one polymer selected from the group consisting of an aromatic vinyl compound/conjugated diene block copolymer comprising a polymer block composed mainly of aromatic vinyl monomer units (hereinafter, referred to simply as "aromatic vinyl polymer block") and a polymer block composed mainly of conjugated diene monomer units (hereinafter, referred to simply as "conjugated diene polymer block") and a hydrogenation product thereof, and an ethylene/α-olefin copolymer.

Specific examples of aromatic vinyl compounds used for producing the aromatic vinyl compound/conjugated diene block copolymer used in the present invention include styrene, α-methyl styrene and vinyl toluene. These compounds can be used individually or in combination. Among the above-exemplified compounds, styrene is especially preferred.

Specific examples of conjugated dienes used for producing the aromatic vinyl compound/conjugated diene block copolymer used in the present invention include butadiene, isoprene, piperylene and 1,3-pentadiene. These compounds can be used individually or in combination. Among the above-exemplified compounds, preferred are butadiene, isoprene and a mixture thereof.

Specific examples of impact modifiers include block copolymers, such as SBS and SEBS.

With respect to the microstructure of a soft segment (composed of the conjugated diene monomer units) of the above-mentioned block copolymer, it is preferred that the 1,2-vinyl bond content or the total content of the 1,2-vinyl bond and the 3,4-vinyl bond is 5 to 80%, more preferably 10 to 50%, most preferably 10 to 40%.

It is preferred that the above-mentioned block copolymer has a block configuration selected from the group consisting of A-B, A-B-A and A-B-A-B, wherein A represents an aromatic vinyl polymer block and B represents a conjugated diene polymer block. The block copolymer used in the present invention can be a mixture of block copolymers having different block configurations.

Among the above-mentioned block configurations, A-B-A and A-B-A-B are preferred. The block copolymer can be a mixture of different block copolymers having the above-mentioned block configurations.

Further, it is preferred that the aromatic vinyl compound/conjugated diene block copolymer used in the present invention is a hydrogenated block copolymer. The "hydrogenated block copolymer" herein means a copolymer which is obtained by hydrogenating any of the above-mentioned aromatic vinyl compound/conjugated diene block copolymers wherein the degree of hydrogenation of the aliphatic double bonds in the conjugated diene polymer block is more than 0% and up to 100%. The degree of hydrogenation of the hydrogenated block copolymer is prefrably 50% or more, more preferably 80% or more, most preferably 98% or more.

In the present invention, a mixture of an unhydrogenated block copolymer and a hydrogenated block copolymer can be used without causing any problem.

With respect to the block copolymer used in the conductive resin composition of the present invention, it is preferred that the block copolymer is a mixture of a low molecular weight block copolymer and a high molecular weight block copolymer. Specifically, it is preferred to use a mixture of a low molecular weight block copolymer having a number average molecular weight of less than 120,000 and a high molecular weight block copolymer having a number average molecular weight of 120,000 or more. It is more preferred to use a mixture of a low molecular weight block copolymer having a number average molecular weight of less than 100,000 and a high molecular weight block copolymer having a number average molecular weight of 200,000 or more.

In the present invention, the number average molecular weight is measured by means of a gel permeation chromatography (GPC) apparatus (for example, GPC SYSTEM 21, manufactured and sold by Showa Denko Co., Japan), using an ultraviolet spectrometric detector (for example, UV-41, manufactured and sold by Showa Denko Co., Japan) and a calibration curve obtained with respect to standard polystyrene samples. The conditions employed for measuring the number average molecular weight are as follows.

(Conditions)
Solvent: chloroform,
Temperature: 40° C.,
Columns: columns for the sample (K-G, X-800RL and K-800R) and columns for the reference
(K-805L, 2 columns),
Flow rate: 10 ml/min,
Wavelength used for detection: 254 nm, and
Pressure: 15 to 17 kg/cm$^2$.

In the measurement of the number average molecular weight, a low molecular weight component by-produced due to the deactivation of a polymerization catalyst may be detected, but such a low molecular weight component is ignored in the calculation of the molecular weight. In general, a correctly calculated molecular weight distribution (weight average molecular weight/number average molecular weight ratio) is in the range of from 1.0 to 1.2.

The weight ratio of the low molecular weight block copolymer to the high molecular weight block copolymer (low molecular weight block copolymer/high molecular weight block copolymer weight ratio) in the mixture of the low molecular weight block copolymer and the high molecular weight block copolymer is generally in the range of from 95/5 to 5/95, preferably 90/10 to 10/90.

Further, in the present invention, when the low molecular weight block copolymer used in the above-mentioned mixture comprises an aromatic vinyl polymer block having a number average molecular weight of 20,000 or more, it becomes possible to improve the heat resistance of the conductive resin composition in addition to the impact resistance.

The number average molecular weight of an aromatic vinyl polymer block of a block copolymer can be calculated from the number average molecular weight of the block copolymer mentioned above in accordance with the following formula:

$$Mn(a)=\{Mn \times a/(a+b)\}/N$$

wherein Mn(a) represents the number average molecular weight of the aromatic vinyl polymer block; Mn represents the number average molecular weight of the block copolymer; "a" represents the % by weight of the total of the aromatic vinyl polymer blocks, based on the weight of the block copolymer; "b" represents the % by weight of the total of the conjugated diene polymer blocks, based on the weight of the block copolymer; and N represents the number of the aromatic vinyl polymer blocks in the block copolymer.

In the present invention, it is preferred that the aromatic vinyl polymer block content of the low molecular weight block copolymer is 55% by weight or more and less than 90% by weight. When the aromatic vinyl polymer block content of the low molecular weight block copolymer is within the above-mentioned range, the beat resistance of the conductive resin composition can be improved.

Further, in the present invention, when the low molecular weight block copolymer is a mixture of a block copolymer having an aromatic vinyl polymer block content of 55% by weight or more and less than 90% by weight and a block copolymer having an aromatic vinyl polymer block content of 20% by weight or more and less than 55% by weight, it becomes possible to improve the melt-fluidity of the conductive resin composition.

Before the block copolymer is mixed with the conductive resin composition of the present invention, the block copolymer may be mixed with an oil composed mainly of a paraffin. The addition of an oil composed mainly of paraffin to the block copolymer leads to the improvement in the processability of the resin composition. The amount of the oil contained in the block copolymer is preferably 1 to 70 parts by weight, relative to 100 parts by weight of the block copolymer. When the block copolymer contains more than 70 parts by weight of the oil, the handling properties of the block copolymer become poor.

In the present invention, the oil composed mainly of a paraffin means a mixture of hydrocarbon compounds each independently having a weight average molecular weight of from 500 to 10,000, which mixture comprises an aromatic ring-containing compound, a naphthenic ring-containing compound and a paraffin compound, wherein the content of the paraffin compound is 50% by weight or more. It is preferred that the oil contains 50 to 90% by weight of a paraffin compound, 10 to 40% by weight of a naphthenic ring-containing compound and not more than 5% by weight of an aromatic ring-containing compound, based on the weight of the oil.

Such an oil composed mainly of a paraffin is commercially available. For example, there can be mentioned PW 380 which is manufactured and sold by Idemitsu Kosan Co., Ltd, Japan.

The above-mentioned aromatic vinyl compound/conjugated diene block copolymer may be a mixture of different block copolymers so long as each of the block copolymers does not adversely affect the properties of the resin composition of the present invention. For example, the block copolymer may be a mixture of block copolymers having different block configurations, a mixture of block copolymers containing different aromatic vinyl monomer units, a mixture of block copolymers containing different conjugated diene monomer units, a mixture of block copolymers having different 1,2-vinyl contents or different total contents of 1,2-vinyl bond and 3,4-vinyl bond, a mixture of block copolymers having different aromatic vinyl monomer unit contents, and a mixture of block copolymers having different degrees of hydrogenation.

As a specific example of ethylene-α-olefin copolymers which can be used in the present invention, there can be mentioned one which is described in Unexamined Japanese Patent Application Laid-Open Specification No. 2001-302911.

Further, the impact modifier used in the conductive resin composition of the pros nt invention may be a modified impact modifier or a mixture of a modified impact modifier and an unmodified impact modifier.

The modified impact modifier mentioned herein means an impact modifier which is modified with at least one modifier compound having at least one unsaturated bond selected from the group consisting of a carbon—carbon double bond and a carbon—carbon triple bond and having at least one group selected from the group consisting of a carboxylic acid group, an acid anhydride group, an amino group, a hydroxyl group and a glycidyl group.

As examples of methods for producing the modified impact modifier, there can be mentioned the following methods (1) to (3):

(1) a method in which an impact modifier and a modifier compound are melt-kneaded in either the presence or absence of a radical initiator at a reaction temperature which is not lower than the softening temperature of the impact modifier and not higher than 250° C., to thereby perform a reaction;

(2) a method in which an impact modifier and a modifier compound are reacted in a solvent therefor in either the presence or absence of a radical initiator at a temperature which is not higher than the softening temperature of the impact modifier; and (3) a method in which an impact modifier is reacted with a modifier compound in the absence of a solvent in either the presence or absence of a radical initiator at a reaction temperature which is not higher than the softening temperature of the impact modifier, without causing the melting of the impact modifier.

Any one of the above-mentioned methods (1) to (3) can be employed, but method (1) is preferred, and method (1) performed in the presence of a radical initiator is more preferred.

As the above-mentioned modifier compound having at least one unsaturated bond selected from the group consisting of a carbon-carbon double bond and a carbon—carbon triple bond and having at least one group selected from the group consisting of a carboxylic acid group, an acid anhydride group, an amino group, a hydroxyl group and a glycidyl group, any of those which are exemplified above as the modifier compound used for modifying a polyphenylene ether can be used.

It is preferred that the conductive resin composition of the present invention contains 30 to 70 parts by weight of a polyamide, 20 to 50 parts by weight of a polyphenylene ether and 5 to 30 parts by weight of an impact modifier, relative to 100 parts by weight of the total of the polyamide, polyphenylene ether and impact modifier. It is more preferred that the conductive resin composition of the present invention contains 40 to 60 parts by weight of the polyamide, 30 to 40 parts by weight of the polyphenylene ether and 5 to 15 parts by weight of the impact modifier, relative to 100 parts by weight of the total of the polyamide, polyphenylene ether and impact modifier.

Further, in the present invention, a compatibility agent can be incorporated into the conductive resin composition during the production thereof. In general, a compatibility agent is used mainly for the purpose of improving the physical properties (such as impact resistance and melt-fluidity) of a polyamide-polyphenylene ether alloy. The compatibility agent which can be used in the present invention is a multifunctional compound which interacts with one or both of the polyphenylene ether and the polyamide.

In the conductive resin composition of the present invention, it is preferred that the compatibility of the polyamide with the polyphenylene ether is improved, if necessary, by using the compatibility agent.

Examples of compatibility agents which can be used in the conductive resin composition of the present invention include those which are described in Unexamined Japanese Patent Laid-Open Specification Nos. Hei 8-48869 and Hei 9-124926. All of the conventional compatibility agents described in these patent documents can be used in the present invention, and the compatibility agents can be used individually or in combination.

Among various conventional compatibility agents, especially preferred are maleic acid, maleic anhydride and citric acid.

The amount of the compatibility agent used in the conductive resin composition of the present invention is preferably 0.1 to 20 parts by weight, more preferably 0.1 to 10 parts by weight, relative to 100 parts by weight of the total of the polyamide and the polyphenylene ether which are contained in the resin composition of the present invention.

In the present invention, in addition to the above-mentioned components of the conductive resin composition, if desired, an additional component(s) can be added to the conductive resin composition so long as the additional component(s) does not adversely affect the excellent properties of the resin composition of the present invention.

The additional components used in the present invention are explained below.

Examples of additional components include thermoplastic resins, such as a polyester and a polyolefin; inorganic fillers (such as talc, kaolin, zonotlite, wollastonite, titanium oxide, potassium titanate and a glass fiber); conventional adhesion modifiers which enhance the affinity between an inorganic filler and a resin; flame retardants (such as a halogenated resin, a silicone flame retardant, magnesium hydroxide, aluminum hydroxide, an organic phosphoric ester compound, ammonium polyphosphate and red phosphorus), fluororesins having an effect to prevent the dripping of flaming particles; plasticizers (such as an oil, a low molecular weight polyolefin, a polyethylene glycol and a fatty ester); auxiliary flame retardants, such as antimony trioxide; carbon black as a pigment; conductivity-imparting agents, such as a carbon fiber, a carbon nanotube and a carbon nanofiber; antistatic agents; various peroxides; zinc oxide; zinc sulfide; antioxidants; ultraviolet absorbers; and light stabilizers.

In the present invention, the amount of the additional component(s) added to the resin composition is not more than 100 parts by weight, relative to 100 parts by weight of the total weight of the polyamide and the polyphenylene ether.

As specific examples of processing apparatuses which can be used to prepare the conductive resin composition of the present invention, there can be mentioned a single-screw extruder, a twin-screw extruder, a roll, a kneader, a Brabender Platograph and a Banbury mixer. Among these apparatuses, preferred is a twin-screw extruder, and especially preferred is a twin-screw extruder provided with a first inlet and at least one second inlet which are, respectively, formed at an upstream portion and a downstream portion of the extruder.

With respect to the melt-kneading temperature used for producing the resin composition, there is no particular limitation. In general, an appropriate temperature for obtaining a desired resin composition is selected from the range of from 240 to 360° C.

As preferred examples of the method for producing the conductive resin composition of the present invention, there can be mentioned a method which uses a twin-screw extruder having a first inlet and a second inlet which are formed, respectively, at an upstream portion and downstream portion of the extruder, wherein an impact modifier and a polyphenylene ether are fed to the extruder from the first inlet, thereby melt-kneading together the impact modifier and the polyphenylene ether at the upstream portion of the extruder, while feeding a conductive masterbatch to the extruder from the second inlet, thereby melt-kneading together the impact modifier, the polyphenylene ether and the conductive masterbatch at the downstream portion of the extruder.

In another aspect of the present invention, there is provided a method for producing a conductive resin composition comprising a polyamide, a polyphenylene ether and conductive carbon black, which comprises the following steps:

(1) providing a conductive masterbatch comprising a polyamide and conductive carbon black, the conductive carbon black being present in the form of at least one agglomerated particle having a major axis of 20 to 100 $\mu$m, and (2) adding the conductive masterbatch to a molten polyphenylene ether.

In the above-mentioned method, it is preferred that an additional amount of polyamide is added to the molten polyphenylene ether, simultaneously with the addition of the conductive masterbatch.

The thus obtained conductive resin composition can be molded into various molded articles by various conventional methods, such as injection molding.

Examples of various molded articles include parts for electrical or electronic appliances, such as an IC tray, a chassis and cabinet of various disc players; parts for office automation machines, such as various computers and peripheral equipment therefor; and mechanical parts; parts for motorcycles, such as a cowl; exterior parts for automobiles, such as a fender, a door panel, a front panel, a rear panel, a locker panel, a rear bumper panel, a back door garnish, an emblem garnish, a panel for a feeding port of a fuel, an over fender, an outer door handle, a door mirror housing, a bonnet air intake, a bumper, a bumper guard, a roof rail, a roof rail leg, a pillar, a pillar cover, a wheel cover, various aero parts (such as a spoiler), various moles and emblems for an automobile; and interior parts for automobiles, such as an instrument panel, a console box and a trim.

Among the above-exemplified molded articles, the conductive resin composition of the present invention is suitable for producing an automobile outer panel, especially a fender of an automobile, which is subjected to an electrostatic coating.

When the conductive resin composition of the present invention is used for producing an automobile outer panel, such as an automobile fender, from the viewpoint of appearance of the outer panel after the electrostatic coating, it is preferred that the average value of the surface roughness measured using a scanning probe microscope is in the range of from 0.05 to 1 $\mu$m (wherein the surface roughness is defined as the difference between the maximum height and the minimum height at the surface of the automobile outer panel).

Specifically, in the present invention, the surface roughness of an automobile outer panel can be determined as follows. From the automobile outer panel, eight different surface portions are selected. With respect to each of the selected eight portions, an area of 20 $\mu$m×20 $\mu$m is observed under a scanning probe microscope (for example, SPA300HV, manufactured and sold by Seiko Instruments Inc., Japan). The obtained images of the eight portions are three dimensionally corrected to obtain images showing the surface profiles of the eight portions. Using the resultant three-dimensionally corrected images, the difference between the maximum height and the minimum height at each of the eight surface portions is determined (wherein each of the maximum and minimum heights is measured from a predetermined base line (e.g. in FIG. 5(c), such base line corresponds to the abscissa)), followed by the calculation of the average value of the obtained eight difference values.

BEST MODE FOR CARRYING OUT THE INVENTION

Hereinbelow, the present invention will be described in more detail with reference to the following Examples and Comparative Examples, which should not be construed as limiting the scope of the present invention.

(Raw Materials)

In the following Examples and Comparative Examples, the following raw materials were used.

(1) Polyamide (hereinafter, abbreviated to "PA")
  (1-1). Polyamide 6 (hereinafter, abbreviated to "PA6")
    Trade name: UBE Nylon 6 SF1013A (manufactured and sold by USE INDUSTRIES, LTD., Japan)
  (1-2) Polyamide 66 (hereinafter, abbreviated to "PA66")
    Number average molecular weight=14,000 Concentration of terminal amino groups=30 miliequivalent/kg
    Concentration of terminal carboxyl groups=100 miliequivalent/kg (2) Conductive carbon black
  Trade name: Ketjenblack EC-600JD (manufactured and sold by Ketjenblack international Corporation, Japan) (hereinafter, abbreviated to "KB")

(3) Polyphenylene ether (hereinafter, abbreviated to "PPE")
  Poly(2,6-dimethyl-1,4-phenylene ether) (manufactured and sold by Asahi Kasei Kabushiki Kaisha, Japan)
  (3-1) Polyphenylene ether (hereinafter, abbreviated to "PPE-1")
    Reduced viscosity: 0.52 dl/g (measured at 30° C. using a 0.5 g/dl chloroform solution of PPE-1)
  (3-2) Polyphenylene ether (hereinafter, abbreviated to "PPE-2")
    Reduced viscosity: 0.42 dl/g (measured at 30° C. using a 0.5 g/dl chloroform solution of PPE-2)
  (3-3) Polyphenylene ether modified with maleic anhydride (hereinafter, abbreviated to "M-PPE")

M-PPE was prepared by adding 0.1 part by weight of a radical initiator and 1.5 parts by weight of maleic anhydride to 100 parts by weight of PPE-2, followed by melt-kneading in a twin-screw extruder (ZSK-5, manufactured and sold by Krupp Werner & Pfleiderer GmbH, Germany) at a cylinder temperature of 320° C.

The amount of the maleic anhydride incorporated into the modified polyphenylene ether was 0.5% by weight, based on the weight of the modified polyphenylene ether.

(4) Polystyrene (hereinafter, abbreviated to "PS")
  Trade name: A & M Polystyrene 685 (manufactured and sold by A & M Styrene Co. Ltd., Japan)

(5) Block copolymer
  (5-1) Polystyrene/hydrogenated polybutadiene/polystyrene block copolymer (hereinafter, abbreviated to "SEBS-1")
    Number average molecular weight=246,000
    Total styrene content=33%
  (5-2) Polystyrene/hydrogenated polybutadiene/polystyrene block copolymer (hereinafter, abbreviated to "SEBS-2")
    Number average molecular weight=77,000
    Total styrene content 67%

(6) Compatibility agent
  (6-1) Citric acid (manufactured and sold by Wako Pure Chemical Industries, Ltd., Japan)
  (6-2) Maleic anhydride (manufactured and sold by Mitsubishi Chemical Corporation, Japan)

(Measuring Methods)

The methods for measuring the number of agglomerated particles of conductive carbon black (hereinafter, referred to as "number of agglomerated particles"), surface roughness, impact resistance, heat resistance, conductivity (surface resistivity and volume resistivity), conductive coating property and amount of heat distortion are explained below.

(1) Number of Agglomerated Particles

A pellet of a masterbatch (i.e., master pellet) was cut by means of a microtome equipped with a glass knife to thereby obtain a cross-section which has a mirror surface. The light reflected from the cross-section was observed with a magnification of ×50 under an optical microscope ("PME3", manufactured and sold by Olympus Optical Co. Ltd., Japan), and a photomicrograph of the cross-section was taken. With respect to a contiguous area of 3 mm$^2$ in the photomicrograph, the number of agglomerated particles each independently having a major axis of 20 to 100 $\mu$m was counted by visual observation. The number of agglomerated particle(s) having a major axis of 30 to 100 $\mu$m, if any, and the number of agglomerated particles) having a major axis of 100 $\mu$m or more, if any, were also counted in the same manner. Since the master pellet had a cylindrical shape, the pellet was cut in a direction substantially perpendicular to the longitudinal direction of the pellet, thereby obtaining a cross-section, and the resultant cross-section was observed. Three cross-sections which were, respectively, obtained from different pellets were observed, and the number of agglomerated particles was determined in terms of the average value of the three counted values at the three cross-sections. It was also confirmed that there was almost no difference in the number of agglomerated particles between the three cross-sections.

(2) Average Value of Surface Roughness (Ra) of the Master Pellet

The central line average roughness (Ra) of a master pellet was measured in accordance with JIS B0601 (1994) by using a surface roughness gauge (Surfcom 579 A, manufactured and sold by Tokyo Seimitsu Co., Ltd., Japan), wherein the Ra value was measured with respect to a flat portion of the pellet. The central line average roughness was measured using a standard measuring head (made of diamond, radius (R) of the tip; 5 $\mu$m) as a contact finger. The measurement was performed under conditions wherein the moving rate of the contact finger was 0.3 mm/sec, the measuring length was 2.5 mm and the cutoff value was 0.8 mm. The measurement was conducted at ten flat portions of the pellet, and an average value of the ten measured values was calculated.

(3) Izod Impact Strength and Deflection Temperature Under Load

Pellets of a resin composition were molded by using a molding machine (IS-80EPN molding machine, manufactured and sold by TOSHIBA CORPORATION, Japan) under conditions wherein the cylinder temperature was 280° C. and the mold temperature was 80° C., to thereby obtain test strips having a thickness of 3.2 mm and a thickness of 6.4 mm, respectively. The notched Izod impact strength of the 3.2 mm-thick test strip was measured in accordance with ASTM D256. Further, the deflection temperature under load (i.e., heat deflection temperature (HDT) under a high load) of the 6.4 mm-thick test strip was measured in accordance with ASTM D648 under a load of 1.82 MPa.

(4) Surface Resistivity and Volume Resistivity-1

Pellets of a resin composition were molded into a test plate (size: 100×50×2.5 mm) by using a molding machine (IS-80EPN molding machine, manufactured and sold by TOSHIBA CORPORATION, Japan) under conditions wherein the cylinder temperature was 280° C. and the mold temperature was 80° C. The surface resistivity and the volume resistivity-1 of the obtained test plate were measured by using a high resistivity mater (MCP-HT450, manufactured and sold by MITSUBISHI CHEMICAL CORPORATION, Japan) at 500 V. The measurement was performed with respect to five different test plates (each prepared in the above-mentioned manner) and each of the surface resistivity value and the volume resistivity-1 value was obtained in terms of the average value of the five measured values.

(5) Volume Resistivity-2

Pellets of a resin composition were molded into a dumbbell-shaped bar described under ISO 294 in accordance with the method described in the Examples of Unexamined Japanese Patent Application Laid-Open Specification No. Hei 8-48869 by using a molding machine (IS-80EPN molding machine, manufactured and sold by TOSHIBA CORPORATION, Japan) under conditions wherein the cylinder temperature was 280° C. and the mold temperature was 80° C. The thus obtained dumbbell-shaped bar was used as a test specimen. Both ends of the test specimen were broken off so as to obtain a portion with a uniform cross section of 10 mm×4 mm and a length of about 70 mm with a fractured surface at both ends. With respect to the specific method for breaking off the ends of the test specimen, the Examples of Unexamined Japanese Patent Application Laid-Open Specification No. Hei 8-48669 have no description. Therefore, the ends of the test specimen were broken off by a method in which a test specimen which had been chipped at two portions with a cutter was immersed in a dry ice/methanol mixture having a temperature of −75 to −70° C. for 1 hour, and the resultant test specimen was broken at the two chipped portions. A silver-containing coating composition (Silbest, manufactured and sold by NISSHIN EM CO., LTD., Japan) was applied to the broken ends of the obtained portion and the volume resistivity between the silver-coated ends was measured by using a digital Insulation testing apparatus (DG 525, SANWA ELECTRIC INSTRUMENT CO., LTD., Japan) wherein a voltage of 250 V was applied. The measurement was performed with respect to five different test specimens (each prepared in the same manner as mentioned above) and the volume resistivity-2 value was obtained in terms of the average value of the five measured values.

(6) Surface Roughness of an Automobile Fender

Figure 5:
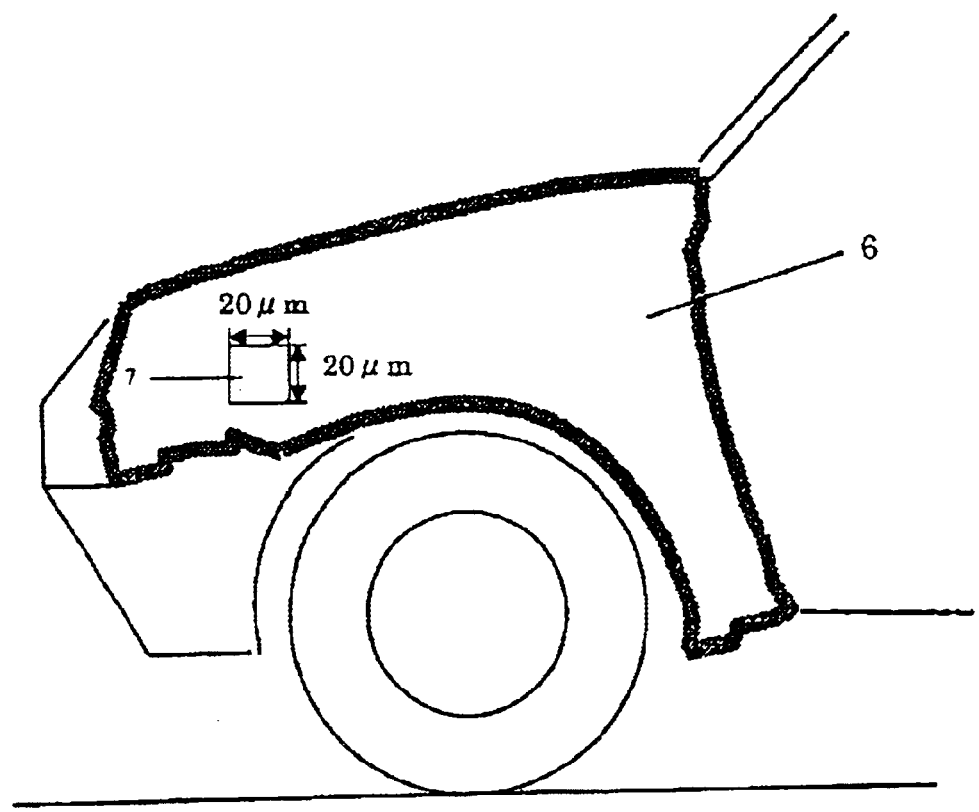
FIG. 5(a) is a schematic explanatory view of a part of an automobile body around a front wheel, which part includes a fender.
FIG. 5(b) is a scanning probe microscopic image of a part of the fender shown in FIG. 5(a)
FIG. 5(c) is an explanatory diagram showing a surface profile of a part of the fender shown in FIG. 5(a).
Figure 5:
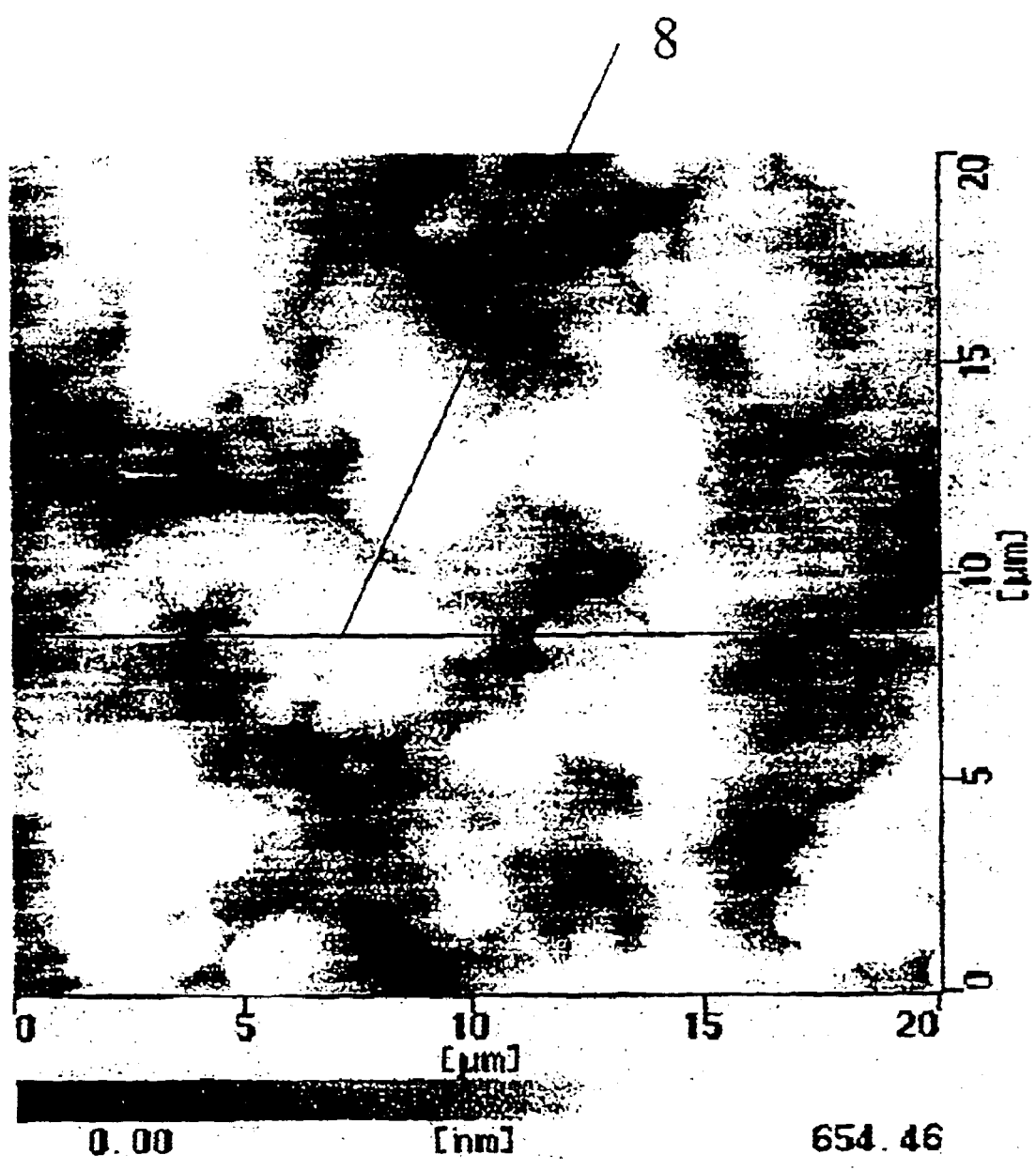
Figure 5:
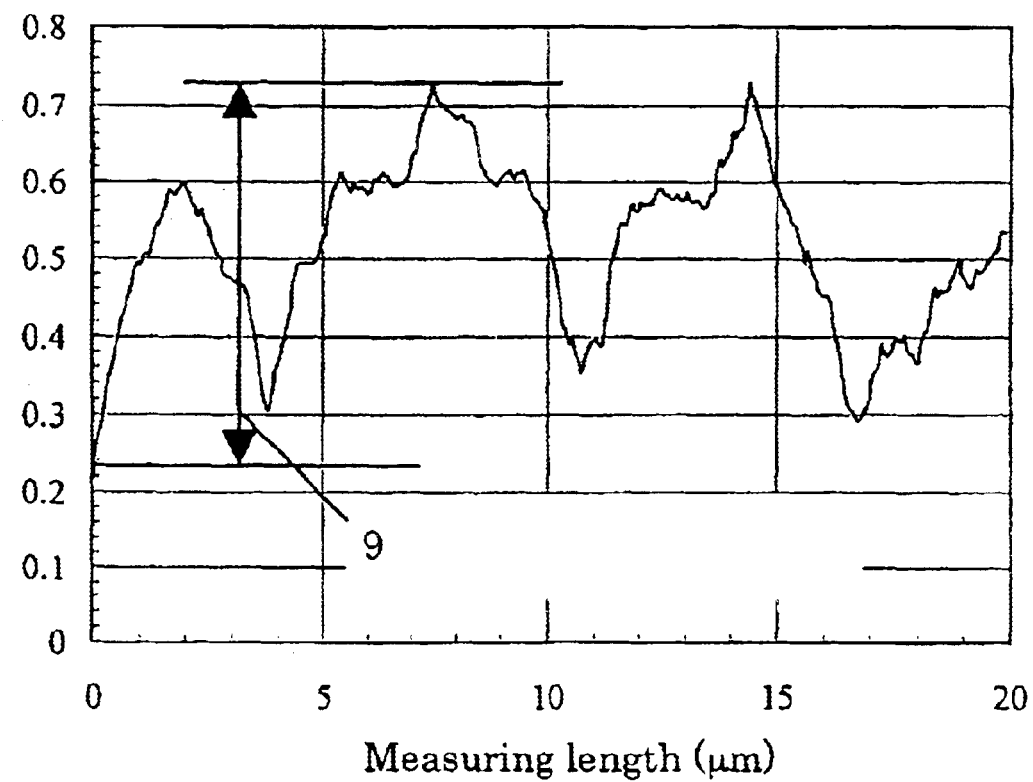

An automobile fender was produced by using a mold desired for an automobile fender under conditions wherein the cylinder temperature was 310° C. and the mold temperature was 110° C. The surface roughness of the produced automobile fender was determined by using a scanning probe microscope (SPA300HV, manufactured and sold by Seiko Instruments Inc., Japan). Specifically, eight different surface portions (each having an area of 20 μm×20 μm) were arbitrarily selected from the automobile fender, and observed under the scanning probe microscope. The resultant images of the eight surface portions were subjected to a three-dimensional correction to obtain images (as shown in FIG. 5(c)) showing the surface profiles of the eight surface portions, and the difference between the maximum height and the minimum height was measured with respect to each of the eight surface portions. The average value of the obtained eight difference values was defined as the surface roughness of the automobile fender. SI-DF20 (manufactured and sold by Seiko Instruments Inc., Japan) was used as a cantilever of the microscope, and the observation was made under conditions wherein the atmosphere was air, the temperature was 25° C., the scanning frequency was 0.5 Hz, the detection mode was dynamic force mode (DFM) and the vibration amplitude was 0.8 V.

(7) Electrostatic Coating Property

An automobile fender produced by the method described in item (6) above was subjected to an electrostatic coating for an automobile. The applicability of the electrostatic coating and the surface appearance (smoothness, clarity and color) of the formed coating were evaluated by visual observation.

(8) Amount of Heat Distortion

An automobile fender produced by the method described in item (6) above was attached to the body of an automobile. The clearance between the automobile fender and the door, and the difference in the clearance among different portions of the automobile fender were det rmined by visual observation, to thereby evaluate the amount of heat distortion caused by thermal history experienced by the fender during the electrostatic coating.

COMPARATIVE EXAMPLE 1

Figure 3:
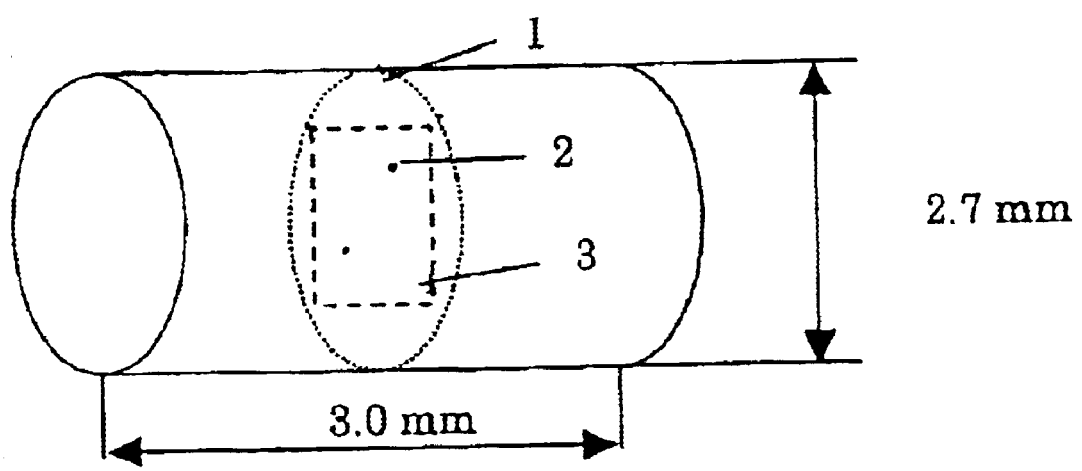
FIG. 3(a) is a schematic explanatory view of a pellet of a conductive masterbatch (PA/KB-MB1) obtained in Comparative Example 1, showing a perspective view of a cross-section of the pellet, which cross-section is observed to determine the number of agglomerated particles of conductive carbon black.
FIG. 3(b) is an optical photomicrograph (×50) of the above-mentioned cross-section of the pellet shown in FIG. 3(a)
Figure 3B:
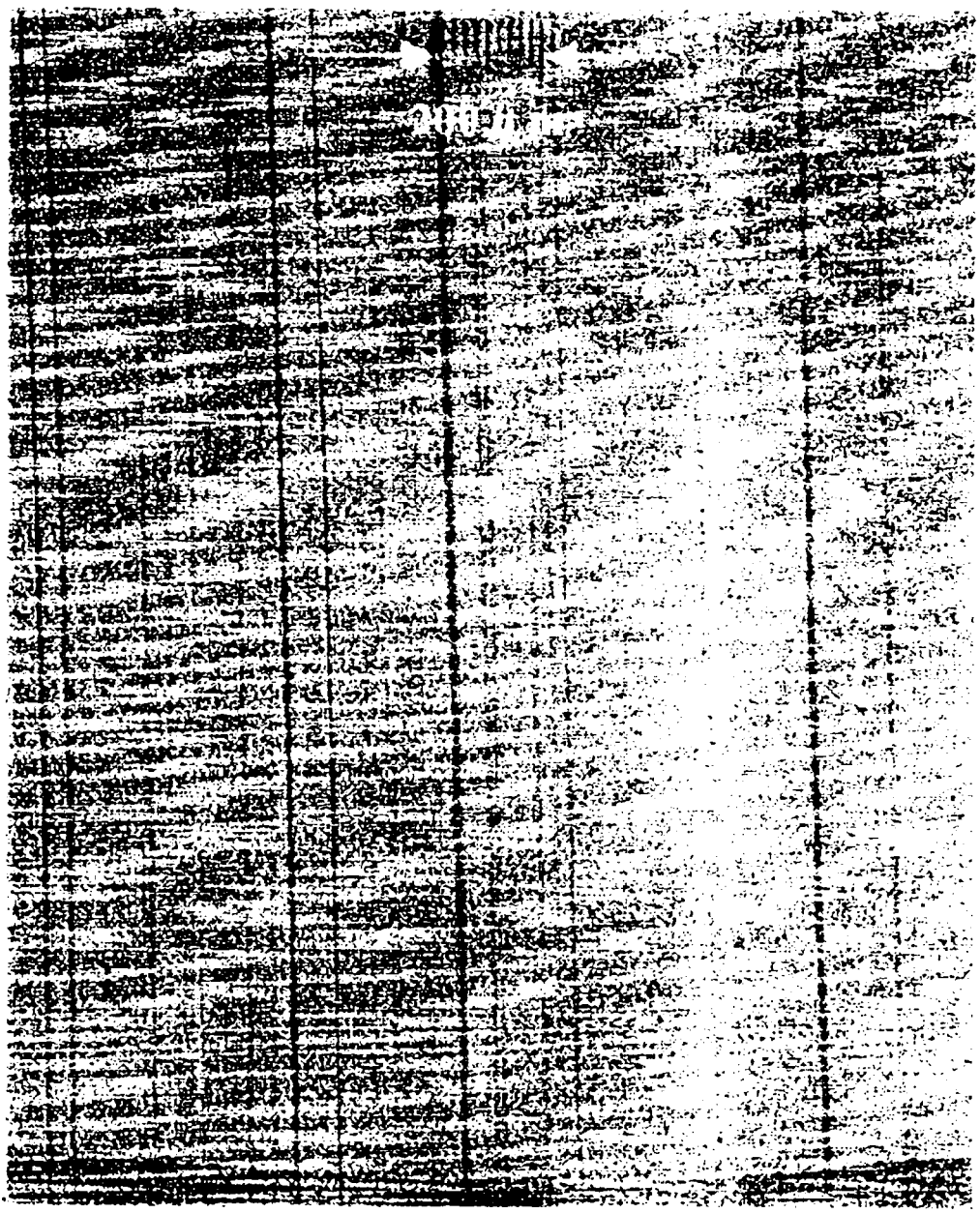

By using a twin-screw extruder (ZSK-25, manufactured and sold by Krupp Werner & Pfleiderer GmbH, Germany) which had one inlet at an upstream portion thereof and another inlet at a downstream portion thereof, 92 parts by weight of polyamide 6 and 8 parts by weight of conductive carbon black were uniformly melt-kneaded at a cylinder temperature of 270° C. in accordance with the method described in the single Example of Unexamined Japanese Patent Application Laid-Open Specification No. Hei 2-201811, to thereby produce a conductive masterbatch in the form of pellets (master pellets) having a surface luster. In the extruder used, the screws were so designed as to generate a high shearing force, such that the surface roughness (average value of the central line average roughness (Ra) values) of the resultant pellets becomes less than 0.3 μm. With respect to the obtained master pellets (hereinafter, abbreviated to "PA/KB-KB1"), the number of agglomerated particles contained therein and the central line average roughness (Ra) at the flat portions thereof were measured (see FIGS. 3(a) and 3(b)).

Further, by using the obtained masterbatch, a resin composition was produced in accordance with the method described in the single Example of Unexamined Japanese Patent Application Laid-Open Specification No. Hei 2-201811. Specifically, pellets of a resin composition comprising polyamide 6, a polyphenylene ether and conductive carbon black were produced at a cylinder temperature of 300° C. The obtained pellets of the resin composition were molded into test specimens, and the surface resistivity and the volume resistivity-1 of the resin composition were measured using the test specimens. The properties of the resin composition are shown in Table 1, together with the formulation of the resin composition.

EXAMPLE 1

A conductive masterbatch comprising polyamide 6 and conductive carbon black (polyamide 6/conductive carbon black masterbatch) which is in the form of pellets (master pellets) having a low surface luster was produced in substantially the same manner as in Comparative Example 1, except that the design of the screws of the twin-screw extruder (ZSX-25, manufactured and sold by Krupp Werner & Pfleiderer GmbH, Germany) (used for melt-kneading 92 parts by weight of polyamide 6 and 8 parts by weight of conductive carbon black at a cylinder temperature of 270° C.) was changed. Specifically, the production of the masterbatch was conducted while controlling the melt-kneading conditions (i.e., the rotation rate of the screws, extrusion rate and the like) to obtain master pellets having a surface roughness (average value of the central line average roughness (Ra) values) of 0.3 μm or more (the melt-kneading conditions employed in Example 1 were mild as compared to those employed in Comparative Example 1). With respect to the obtained master pellets (hereinafter, abbreviated to "PA/KB-MB2"), the number of agglomerated particles contained therein and the central line average roughness (Ra) of the flat portions thereof were measured (see FIGS. 4(a), 4(b) and 4(c)).

Further, by using the obtained conductive masterbatch, pellets of a resin composition comprising polyamide 6, a polyphenylene ether and conductive carbon black were produced in substantially the same manner as in Comparative Example 1. The obtained pellets of the resin composition were molded into test specimens, and the surface resistivity and the volume resistivity-1 of the resin composition were measured using the test specimens. The properties of the resin composition are shown in Table 1, together with the formulation of the resin composition,

TABLE 1

| Feeding inlet of the extruder | Components | Units | Comp. Ex. 1 | Ex. 1 |
|---|---|---|---|---|
| | | | Formulation of the resin composition | |
| Inlet at an upstream portion of the extruder | PPE-1 | Parts by weight | 38 | 38 |
| | Citric acid | | 1 | 1 |
| | PS | | 12 | 12 |
| | PA6 | | 6.5 | 6.5 |
| | PA/KB-MB1 | | 37.5 | |
| | PA/KB-MB2 | | | 37.5 |
| Results of the measurements (with respect to each of masterbatches PA/KB-MB1 and PA/KB-MB2) | | | | |
| Number of agglomerated particles (major axis: 20–100 μm) | | — | 0 | 16 |
| Number of agglomerated particles (major axis: 30–100 μm) | | — | 0 | 9 |
| Number of agglomerated particles (major axis: >100 μm) | | — | 0 | 0 |
| Surface roughness (average value of the central line average roughness (Ra) values) | | μm | 0.22 | 1.04 |
| Results of the measurements (with respect to each of resin compositions PA6/PPE/KB-MB1 and PA6/PPE/KB-MB2) | | | | |
| Surface resistivity | | Ω | $4.5 \times 10^9$ | $3.6 \times 10^7$ |
| Volume resistivity-1 | | Ω · cm | $3.7 \times 10^{10}$ | $3.0 \times 10^7$ |

In Comparative Example 1, the production of the masterbatch was performed in the same manner as in the single Example of Unexamined Japanese Patent Application Laid-Open Specification No. Hei 2-201811, using the materials described in this patent document. Specifically, in Comparative Example 1, a masterbatch in the form of pellets (master pellet) was produced by uniformly melt-kneading conductive carbon black with polyamide, followed by extrusion.

With respect to the produced master pellets, no agglomerated particle of the conductive carbon black having a major axis of 20 μm or more was observed. Further, by using the produced master pellets, a resin composition was produced under the conditions described in the single Example of Unexamined Japanese Patent Application Laid-Open Specification No. Hei 2-201811. Specifically, a polyphenylene ether, citric acid, polystyrene and polyamide 6 were extruded together with the masterbatch by using a twin-screw extruder, thereby obtaining a resin composition in the form of pellets.

On the other hand, the master pellets produced in Comparative Example 1 contained 16 agglomerated particles (each independently having a major axis of 20 μm or more) of carbon black, the presence of which is one of the characteristic feature of the present invention. Further, the produced master pellets were extruded together with a polyphenylene ether, citric acid, polystyrene and polyamide 6 by using a twin-screw extruder in the same manner as in Comparative Example 1, thereby obtaining a resin composition in the form of pellets.

The resin compositions obtained in Comparative Example 1 and Example 1 were individually subjected to an injection molding, to thereby obtain test specimens, and the surface resistivity and volume resistivity-1 of each resin composition were evaluated using the obtained test specimens. As shown in Table 1, the surface resistivity and volume resistivity-1 of the resin composition of Example 1 were lower than those of the resin composition of Comparative Example 1 (which corresponds to the single Example of Unexamined Japanese Patent Application Laid-Open Specification No. Hei 2-201811) by two orders of magnitude and three orders of magnitude, respectively. It is apparent from these results that the resin composition of Example 1 exhibits excellent conductivity.

Accordingly, it has become apparent that the conductivity of a resin composition comprising a polyamide, a polyphenylene ether and conductive carbon black can be remarkably improved by the use of the masterbatch of the present invention in which the conductive carbon black is present in the form of at least one agglomerated particle having a major axis of 20 to 100 μm.

COMPARATIVE EXAMPLE 2

In accordance with the method described in the single Example of Unexamined Japanese Patent Application Laid-Open Specification No. Hei 2-201811, 90 parts by weight of polyamide 66 and 10 parts by weight of conductive carbon black were uniformly melt-kneaded at a cylinder temperature of 270° C., thereby producing a conductive masterbatch in the form of pellets (master pellets) having a surface luster. In the extruder used, the screws were so designed as to generate a high shearing force, such that the surface roughness (average value of the central line average roughness (Ra) values) of the resultant pellets becomes less than 0.3 μm. With respect to the obtained master pellets (hereinafter, abbreviated to "PA/KB-MB3"), the number of agglomerated particles contained therein and the central line average roughness (Ra) of the flat portions thereof were measured.

Further, using the obtained master pellets, a resin composition in the form of pellets was produced by using a twin-screw extruder (ZSK-25, manufactured and sold by Krupp Werner & Pfleiderer GmbH, Germany) having one inlet at an upstream portion thereof and another inlet at a downstream portion thereof. Specifically, the conductive masterbatch (PA/KB-MB3) were melt-kneaded together with a polyphenylene ether, a block copolymer and polyamide 66 in the extruder at a cylinder temperature of 300° C., wherein the polyphenylene ether and the block copolymer were fed to the extruder from the inlet provided at an upstream portion thereof, while feeding polyamide 66 and the conductive masterbatch (PA/KB-MB3) to the extruder from the inlet provided at a downstream portion thereof, thereby obtaining a resin composition comprising polyamide 66, the polyphenylene ether and the conductive carbon black. The obtained resin composition was molded into test specimens, and the volume resistivity-2, deflection temperature under load and Izod impact strength of the resin composition were evaluated using the test specimen. The results are shown in Table 2, together with the formulation of the resin composition.

COMPARATIVE EXAMPLE 3

A resin composition was produced using a twin-screw extruder (ZSK-25, manufactured and sold by Krupp Warner & Pfleiderer GmbH, Germany) having an inlet at an upstream portion thereof and two inlets at down-stream portions thereof (with respect to the two inlets provided at downstream portions of the extruder, the first and second inlets, as view in the direction of from the upstream to downstream of the extruder, are referred to as "1st downstream-side inlet" and "2nd downstream-side inlet"). In accordance with the method described in Unexamined Japanese Patent Application Laid-Open Specification No. Hei 8-48869, a polyphenylene ether, a block copolymer, polyamide 66 and conductive carbon black were melt-kneaded together at a cylinder temperature of 300° C., wherein the polyphenylene ether and the block copolymer were fed to the extruder from the inlet at an upstream portion thereof and the polyamide 66 was fed to the extruder from the 1st downstream-side inlet, thereby compatibilizing the polyphenylene ether with the polyamide, while feeding the conductive carbon black from the 2nd downstream-side inlet, thereby producing a resin composition in the form of pellets, which composition comprises polyamide 66, a polyphenylene ether and conductive carbon black. The obtained resin composition in the form of pellets was molded into test specimens, and the volume resistivity-2, deflection temperature under load and Izod impact strength of the resin composition were measured using the test specimens in the above-mentioned manner. The results are shown in Table 2, together with the formulation of the resin composition.

COMPARATIVE EXAMPLE 4

A resin composition was produced by a method described in claim 9 of Unexamined Japanese Patent Application Laid-Open Specification No. Hei 8-48869. Specifically, the resin composition was produced in substantially the same manner as in Comparative Example 3, except that masterbatch PA/KB-MB3 was used in an amount as shown in Table 2 below instead of the conductive carbon black, and the masterbatch was fed to the extruder from the 2nd downstream-side inlet. The properties of the resin composition are shown in Table 2, together with the formulation of the resin composition.

EXAMPLES 2 TO 4

In each of Examples 2 to 4, a conductive masterbatch in the form of pallets (master pellets) having a low surface luster was produced in substantially the same manner as in Comparative Example 2, except that the design of the screws of the twin-screw extruder (used for melt-kneading 90 parts by weight of polyamide 6 and 10 parts by weight of conductive carbon black at a cylinder temperature of 270° C.) was changed. Specifically, the production of the masterbatch was conducted while controlling the melt-kneading conditions (the rotation rate of the screws, the extrusion rate and the like) to obtain master pellets having a surface roughness (average value of the central line average roughness (Ra) values) of 0.3 μm or more (the melt-kneading conditions employed in each of Examples 2 to 4 were mild as compared to those employed in Comparative Example 2). (The masterbatches produced in Examples 2, 3 and 4 are referred to as "PA/KB-MB4", "PA/KB-MB5" and "PA/KB-MB6", respectively). With respect to the obtained master pellets, the number of agglomerated particles contained therein and the central line average roughness (Ra) of the flat portions thereof were measured.

In Examples 2 to 4, resin compositions were individually produced in substantially the same manner as in Comparative Example 2, except that the above-obtained conductive masterbatches were used in accordance with the formulations shown in Table 2 below. The properties of the resin compositions are shown in Table 2, together with the formulations of the resin compositions.

EXAMPLE 5

A resin composition was produced in substantially the same manner as in Comparative Example 3, except that masterbatch PA/KB-MB5 was fed to the extruder in an amount shown in Table 2 from the 2nd downstream-side inlet, instead of the conductive carbon black. The properties of the resin composition are shown in Table 2, together with the formulation of the resin composition.

TABLE 2

| Feeding inlet of the Extruder | Components of the resin composition | Units | Comp. Ex. 2 | Comp. Ex. 3 | Comp. Ex. 4 | Ex. 2 | Ex. 3 | Ex. 4 | Ex. 5 |
|---|---|---|---|---|---|---|---|---|---|
| | | | \multicolumn{7}{c}{Formulation of the resin composition} | | | | | | |
| Inlet provided at an upstream portion of the extruder | PPE-1 | Parts by weight | 20 | 20 | 20 | 20 | 20 | 20 | 20 |
| | M-PPE | | 14 | 14 | 14 | 14 | 14 | 14 | 14 |
| | SEBS-1 | | 8.5 | 8.5 | 8.5 | 8.5 | 8.5 | 8.5 | 8.5 |
| | SEBS-2 | | 2.5 | 2.5 | 2.5 | 2.5 | 2.5 | 2.5 | 2.5 |
| 1st downstream-side inlet | PA66 | | 36 | 53 | 36 | 36 | 36 | 36 | 36 |
| | PA/KB-MB3 | | 19 | | | | | | |
| | PA/KB-MB4 | | | | | 19 | | | |
| | PA/KB-MB5 | | | | | | 19 | | |
| | PA/KB-MB6 | | | | | | | 19 | |

TABLE 2-continued

| Feeding inlet of the Extruder | Components of the resin composition | Units | Comp. Ex. 2 | Comp. Ex. 3 | Comp. Ex. 4 | Ex. 2 | Ex. 3 | Ex. 4 | Ex. 5 |
|---|---|---|---|---|---|---|---|---|---|
| | | | | | Formulation of the resin composition | | | | |
| 2nd downsteam-side inlet | PA/KB-MB3 | | | | 19 | | | | |
| | PA/KB-MB5 | | | | | | | | 19 |
| | KB | | | 1.9 | | | | | |
| Results of measurements (with respect to each of masterbatches PA/KB-MB3, PA/KB-MB4, PA/KB-MB5 and PA/KB-MB6) | | | | | | | | | |
| Number of agglomerated particles (major axis: 20–100 μm) | | — | 0 | — | 0 | 19 | 4 | 44 | 4 |
| Surface roughness (average value of central line average roughness (Ra) values) | | μm | 0.25 | — | 0.25 | 1.18 | 0.49 | 1.6 | 0.49 |
| Results of measurements (with respect to each of the produced resin compositions (PA66/PPE/KB's)) | | | | | | | | | |
| Volume resistivity-2 | | Ω·cm | $4 \times 10^6$ | $5 \times 10^4$ | $7 \times 10^6$ | $8 \times 10^4$ | $7 \times 10^4$ | $8 \times 10^4$ | $7 \times 10^4$ |
| HDT under a high load (1.82 MPa) | | °C. | 125 | 124 | 125 | 129 | 128 | 130 | 129 |
| Izod impact strength | | J/m | 210 | 180 | 210 | 210 | 220 | 185 | 205 |

The method employed in Comparative Example 3 is the same as disclosed in Unexamined Japanese Patent Application Laid-Open Specification No. Hei 8-48869 (see claims 7 and 8, and paragraphs [0008], [0010] and [0011]). Specifically, the resin composition was produced by a method which comprises a step of forming a compatibilized polyphenylene ether/polyamide base resin mixture in an extruder having a side feeder (i.e., an inlet provided at a downstream portion); and a step of mixing conductive carbon black with the compatibilized polyphenylene ether/polyamide base resin mixture which is in a molten form and has a temperature of at least 300° C.

On the other hand, in each of Examples 2 to 4, the resin composition was produced by a method which comprises a step of producing a conductive masterbatch which comprises a polyamide and conductive carbon black which is present in the form of agglomerated particles having a major axis of 20 to 100 μm (the presence of such agglomerated particles is one of the characteristic features of the present invention); and a step of simultaneously adding the produced conductive masterbatch and a polyamide to a molten polyphenylene ether.

Each of the resin compositions obtained in comparative Example 3 and Examples 2 to 4 was individually subjected to an injection molding, to thereby obtain test specimens, and the volume resistivity-2, deflection temperature under load (high load HDT) and Izod impact strength of each of the resin compositions were measured using the obtained test specimens. As a result, it was found that each of the resin compositions of Examples 2 to 4 exhibited a volume resistivity-2 which is not so different from that of the resin composition of Comparative Example 3 (which is produced by the method corresponding to the method described in the single Example of Unexamined Japanese Patent Application Laid-Open Specification No. Hei 8-48869), but exhibited a deflection temperature under load and an Izod impact strength which are higher than those of the resin composition of Comparative Example 3. Therefore, it is apparent that the resin compositions produced in Examples 2 to 4 of the present invention had excellent heat distortion resistance and impact resistance.

Thus, by using the masterbatch of the present invention in which the conductive carbon black is present in the form of agglomerated particles, the deflection temperature under load (or high load HDT) of a resin composition comprising a polyamide, a polyphenylene ether and conductive carbon black could be improved and a high conductivity could be achieved while maintaining the impact resistance.

Further, none of the masterbatches produced in Examples 2 to 5 contained conductive carbon black in the form of an agglomerated particle having a major axis of 100 μm or more. In addition, the melt flow rate (MFR: determined in accordance with ASTM D 1238, i.e., a flow rate of a molten resin per 10 minutes at 280° C. under a load of 5 kg) of each of the resin compositions produced in Examples 3 and 5 was measured. As a result, it was found that the MFR of the resin compositions of Examples 3 and 5 were 24 g/10 min, and 19 g/10 min., respectively. From the above, it is apparent that a conductive resin composition which exhibits excellent conductivity, impact resistance, heat distortion resistance and melt-fluidity can be obtained by a method which comprises the following steps: (1) providing a conductive masterbatch comprising a polyamide and conductive carbon black, said conductive carbon black being present in the form of at least one agglomerated particle having a major axis of 20 to 100 μm, and (2) adding said conductive masterbatch to a molten polyphenylene ether.

COMPARATIVE EXAMPLE 5

An automobile fender was produced by molding the conductive resin composition produced in Comparative Example 2, and the produced fender was subjected to an automobile coating process to thereby electrostatically coat the fender. As a result, it was found that the electrostatic coating property of the resultant fender was unsatisfactory. Further, the fender suffered a large amount of heat distortion and, hence, could not be put into practical use. Specifically, the clearance between the automobile fender and the door was large and the difference in the clearance among different portions of the fender was also large.

COMPARATIVE EXAMPLE 6

An automobile fender was produced by molding the conductive resin composition produced in Comparative Example 3, and the produced fender was subjected to an automobile coating process to thereby electrostatically coat the fender. As a result, it was found that the electrostatically coated fender suffered a large amount of heat distortion and, hence, could not be put into practical use. Specifically, the clearance between the automobile fender and the door was large and the difference in the clearance among different portions of the fender was also large.

EXAMPLE 6

An automobile fender was produced by molding the conductive resin composition produced in Example 2, and the produced fender was subjected to an automobile coating process to thereby electrostatically coat the fender. The resultant electrostatically coated fender produced using the resin composition of Example 2 exhibited only a very small amount of heat distortion (i.e., the clearance between the automobile fender and the door was small, and the clearance was uniform), and the electrostatic coating property was satisfactory. Further, the electrostatically coated fender had satisfactory impact resistance. Thus, the electrostatically coated fender could be advantageously put into practical use. The surface roughness of the fender was 0.65 $\mu$m and the fender had an excellent appearance even after the electrostatic coating (see FIGS. 5(a), 5(b) and 5(c)).

INDUSTRIAL APPLICABILITY

By the use of the conductive masterbatch of the present invention, it becomes possible to obtain a conductive resin composition which not only has excellent heat resistance, but also simultaneously exhibits excellent conductivity and impact resistance (wherein the "excellent conductivity" means a conductivity which is comparable or superior to that of a conventional material which is subjected to an electrostatically coated. i.e., conductivity sufficient to enable a material to be electrostatically coated). Such a conductive resin composition can be used in a wide variety of fields, such as electric and electronic parts, parts of office automation machines, automobile parts and other mechanical parts. Especially, the conductive resin composition of the present invention is very advantageous as a material fox producing an automobile outer panel (e.g., automobile fender) because when the above-mentioned resin composition is molded into a large article (such as an automobile outer panel, a door panel and the like) and the resultant molded article is then subjected to an electrostatic coating, an excellent molded article can be obtained, wherein the molded article is unlikely to suffer not only heat distortion but also a lowering of the impact resistance and wherein an excellent coating can be formed on such a molded article due to the excellent conductivity of the resin composition.

What is claimed is:

1. A conductive masterbatch comprising a polyamide and conductive carbon black, said conductive carbon black being present in the form of at least one agglomerated particle having a major axis of 20 to 100 $\mu$m, wherein the number of said at least one agglomerated particle is 1 to 100 as observed under an optical microscope with respect to a contiguous area of 3 mm².

2. The conductive masterbatch according to claim 1, wherein the number of said at least one agglomerated particle is 1 to 50.

3. The conductive masterbatch according to claim 1, wherein the number of said at least one agglomerated particle is 2 to 40.

4. The conductive masterbatch according to claim 1, wherein the number of said at least one agglomerated particle is 2 to 30.

5. The conductive masterbatch according to claim 1, wherein the conductive carbon black has a dibutyl phthalate (DBP) oil absorption of at least 250 ml per 100 g of the carbon black.

6. The conductive masterbatch according to claim 1, which is in the form of pellets.

7. The conductive masterbatch according to claim 6, wherein the surface roughness of each of the pellets is in the range of from 0.3 to 2.0 $\mu$m in terms of an average value of the surface roughness (Ra) values as measured by a surface roughness gauge with respect to ten different surface portions of each of the pellets.

8. The conductive masterbatch according to claim 6, wherein the surface roughness of each of the pellets is in the range of from 0.4 to 1.5 $\mu$m.

9. The conductive masterbatch according to claim 6, wherein each of the pellets has a cylindrical shape, and has a diameter of from 1.5 to 3.5 mm and a length of from 2.0 to 3.5 mm.

10. The conductive masterbatch according to claim 1, wherein the amount of the conductive carbon black is in the range of from 5 to 40% by weight, based on the weight of the masterbatch.

11. The conductive masterbatch according to claim 1, wherein the amount of the conductive carbon black is in the range of from 6 to 10% by weight, based on the weight of the masterbatch.

12. A conductive resin composition comprising a polyamide, a polyphenylene ether and conductive carbon black, which is produced by melt-kneading the conductive masterbatch of claim 1 with the polyphenylene ether and optionally an additional amount of a polyamide.

13. The conductive resin composition according to claim 12, wherein the amount of the conductive carbon black is in the range of from 0.2 to 5 parts by weight, relative to 100 parts by weight of the total of the components of the conductive resin composition excluding the conductive carbon black.

14. The conductive resin composition according to claim 12, which is for use in the production of an automobile outer panel.

15. A method for producing a conductive resin composition comprising a polyamide, a polyphenylene ether and conductive carbon black, which comprises the following steps:

(1) providing a conductive masterbatch comprising a polyamide and conductive carbon black, said conductive carbon black being present in the form of at least one agglomerated particle having a major axis of 20 to 100 $\mu$m, and (2) adding said conductive masterbatch to a molten polyphenylene ether.

16. The method according to claim 15, wherein, in the step (2), an additional amount of polyamide is added to the molten polyphenylene ether, simultaneously with the addition of the conductive masterbatch.

17. The method according to claim 15 or 16, wherein said conductive masterbatch provided in step (1) is the masterbatch of claim 1.

\* \* \* \* \*